(12) United States Patent
Kaneko

(10) Patent No.: US 11,151,779 B2
(45) Date of Patent: Oct. 19, 2021

(54) INFORMATION PROCESSING APPARATUS, INFORMATION PROCESSING METHOD, AND STORAGE MEDIUM FOR IMAGE DISPLAY AND VIRTUAL LIGHT SOURCE REPRESENTATION

(71) Applicant: CANON KABUSHIKI KAISHA, Tokyo (JP)

(72) Inventor: Chiaki Kaneko, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/667,146

(22) Filed: Oct. 29, 2019

(65) Prior Publication Data

US 2020/0143588 A1 May 7, 2020

(51) Int. Cl.
| G06T 15/50 | (2011.01) |
| H04N 5/235 | (2006.01) |
| H04N 5/262 | (2006.01) |
| G06T 7/73 | (2017.01) |
| H04N 5/222 | (2006.01) |
| G06T 15/60 | (2006.01) |

(52) U.S. Cl.
CPC ............ G06T 15/506 (2013.01); G06T 7/73 (2017.01); G06T 15/60 (2013.01); H04N 5/2224 (2013.01); H04N 5/235 (2013.01); H04N 5/262 (2013.01)

(58) Field of Classification Search
CPC ..... G06T 15/506; G06T 15/60; G06T 19/006; H04N 5/235; H04N 5/2224
See application file for complete search history.

(56) References Cited

U.S. PATENT DOCUMENTS

| 2014/0023237 | A1 | 1/2014 | Basso | |
| 2016/0012642 | A1* | 1/2016 | Lee | ...... G06T 15/506 345/426 |
| 2016/0063764 | A1* | 3/2016 | Okamoto | ...... G06K 9/00671 345/633 |
| 2016/0225183 | A1* | 8/2016 | Lee | ...... G06T 15/60 |
| 2017/0244882 | A1* | 8/2017 | Kitajima | ...... H04N 5/2352 |
| 2018/0088795 | A1* | 3/2018 | van Os | ...... H04W 4/029 |
| 2018/0122043 | A1* | 5/2018 | Energin | ...... A63F 13/428 |

FOREIGN PATENT DOCUMENTS

| CN | 104954697 A | 9/2015 |
| CN | 105517279 A | 4/2016 |
| CN | 107197171 A | 9/2017 |
| JP | 2018-010497 A | 1/2018 |

* cited by examiner

*Primary Examiner* — Charles Tseng
(74) *Attorney, Agent, or Firm* — Canon U.S.A., Inc. IP Division

(57) ABSTRACT

An information processing apparatus includes a display unit configured to display a captured image and an object representing a state of a virtual light source, a change unit configured to change the object and change the state of the virtual light source based on an elapsed time, and an adding unit configured to add a lighting effect to the captured image, the lighting effect being provided by the virtual light source the state of which has been changed by the change unit.

18 Claims, 19 Drawing Sheets

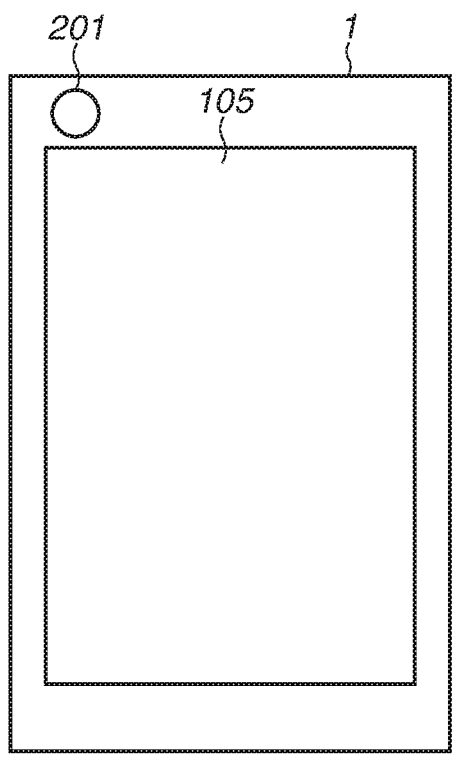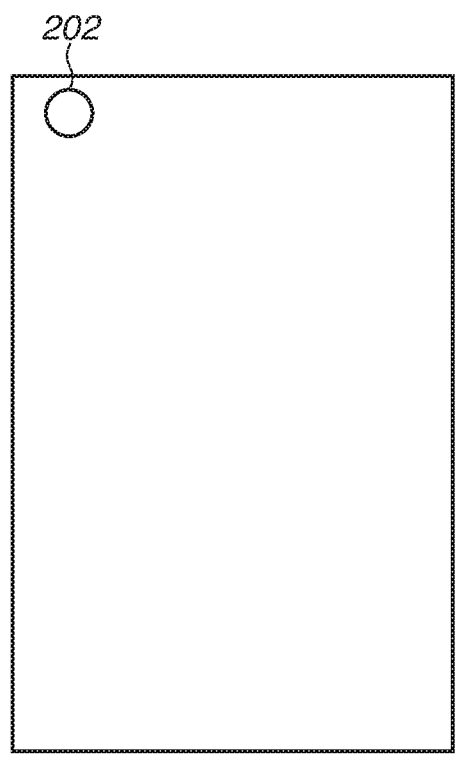

FIG.10A
| INPUT | OUTPUT | | |
|---|---|---|---|
| $\Delta t[s]$ | $\Delta u_p$ | $\Delta v_p$ | $\Delta S_p$ |
| 0.0 | 0.000 | 0.000 | 0.0 |
| 10.0 | 0.000 | 0.000 | 0.0 |
| 10.5 | 0.000 | 0.000 | -0.2 |
| 11.0 | 0.001 | 0.017 | -0.4 |
| 11.5 | 0.006 | 0.033 | -0.2 |
| 12.0 | 0.013 | 0.048 | 0.0 |
| 12.5 | 0.023 | 0.063 | 0.2 |
| 13.0 | 0.035 | 0.076 | 0.4 |
| 13.5 | 0.050 | 0.077 | 0.2 |
| 14.0 | 0.064 | 0.077 | 0.0 |
| 14.5 | 0.077 | 0.064 | -0.2 |
| 15.0 | 0.087 | 0.050 | -0.4 |
| 15.5 | 0.094 | 0.034 | -0.2 |
| 16.0 | 0.098 | 0.017 | 0.0 |
| 16.5 | 0.100 | 0.000 | 0.2 |
| ⋮ | | | |
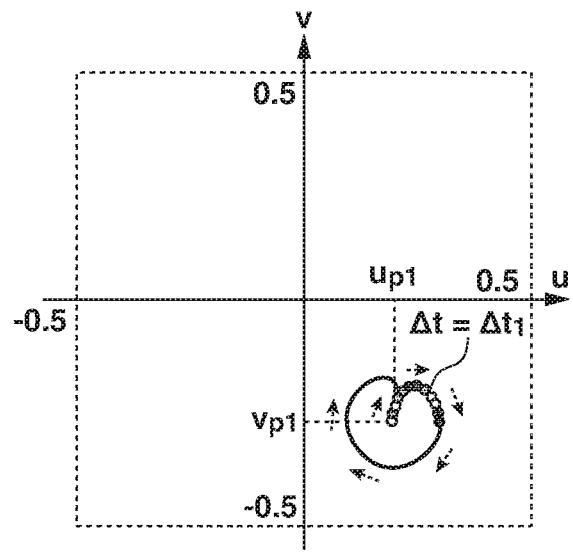
FIG.10B
FIG.10C
| INPUT | OUTPUT | | |
|---|---|---|---|
| $\Delta t[s]$ | $\Delta u_p$ | $\Delta v_p$ | $\Delta S_p$ |
| 0.0 | -0.477 | 0.157 | -0.5 |
| 0.1 | -0.412 | 0.109 | -0.4 |
| 0.2 | -0.350 | 0.072 | -0.3 |
| 0.3 | -0.292 | 0.046 | -0.2 |
| 0.4 | -0.239 | 0.028 | -0.1 |
| 0.5 | -0.191 | 0.015 | 0.0 |
| 0.6 | -0.147 | 0.008 | 0.0 |
| 0.7 | -0.109 | 0.003 | 0.0 |
| 0.8 | -0.076 | 0.001 | 0.0 |
| 0.9 | -0.048 | 0.000 | 0.0 |
| 1.0 | -0.027 | 0.000 | 0.0 |
| 1.1 | -0.012 | 0.000 | 0.0 |
| 1.2 | -0.003 | 0.000 | 0.0 |
| 1.3 | 0.000 | 0.000 | 0.0 |
| 1.4 | 0.000 | 0.000 | 0.0 |
| ⋮ | | | |
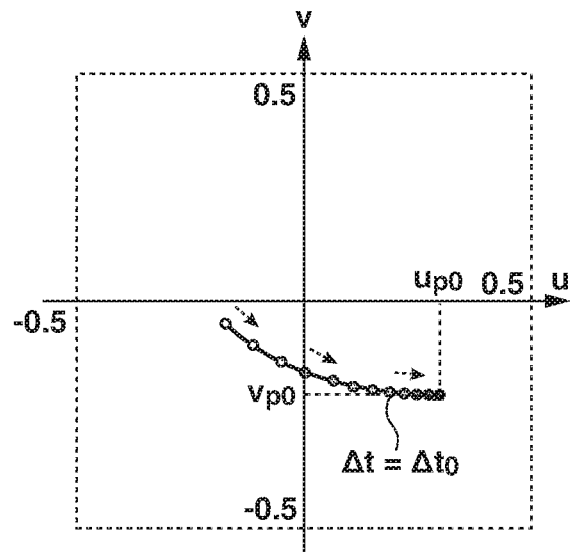
FIG.10D

|  | $P_{LPk}$ | $P_{LAk}$ | $(Ir_{Lk}, Ig_{Lk}, Ib_{Lk})$ | $Type_{Lk}$ | $Shape_{Lk}$ | $Size_{Lk}$ | $\theta_{Lk}$ |
|---|---|---|---|---|---|---|---|
| $Q_{00}$ | $(0, h_{top}, d_{at})$ | $(0, 0, d_{at})$ | $(1, 1, 1)$ | Area | Square | 100 | — |
| $Q_{10}$ | $(-W_p, h_p, d_p)$ | $(0, 0, d_{at})$ | $(1, 1, 1)$ | Point | — | — | 30 |
| $Q_{20}$ | $(W_p, h_p, d_p)$ | $(0, 0, d_{at})$ | $(1, 1, 1)$ | Point | — | — | 30 |
| $Q_{30}$ | $(-W_s, h_s, d_s)$ | $(0, 0, d_{at})$ | $(1, 1, 1)$ | Area | Square | 45 | — |
| $Q_{40}$ | $(W_s, h_s, d_s)$ | $(0, 0, d_{at})$ | $(1, 1, 1)$ | Area | Square | 45 | — |
| $Q_{50}$ | $(0, h_{btm}, d_{btm})$ | $(0, 0, d_{at})$ | $(1, 1, 1)$ | Area | Square | 60 | — |

FIG.18
| (ID) m | $\alpha_{m,0}$ | $\alpha_{m,1}$ | $\alpha_{m,2}$ | $\alpha_{m,3}$ | $\alpha_{m,4}$ | $\alpha_{m,5}$ | |
|---|---|---|---|---|---|---|---|
| 0 | 1 | 1 | 0 | 1 | 1 | 1 | 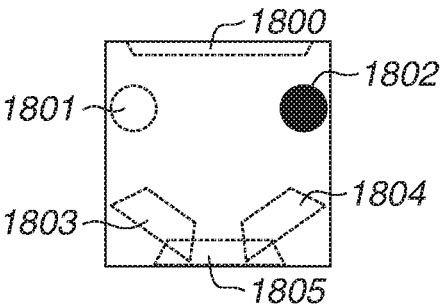 |
| 1 | 0 | 1 | 0 | 1 | 1 | 1 | 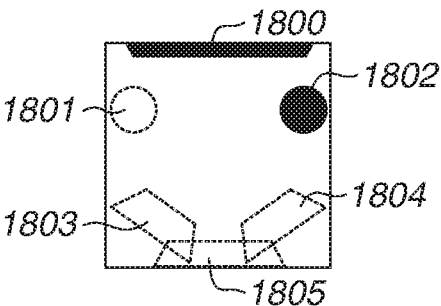 |
| 2 | 1 | 1 | 1 | 0 | 1 | 1 | 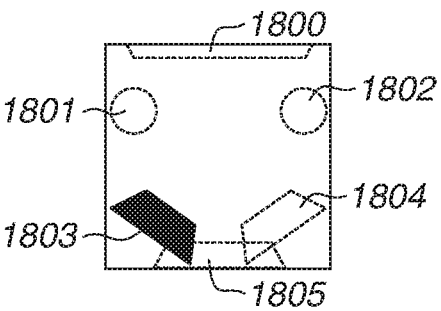 |
| 3 | 1 | 0 | 1 | 1 | 0.9 | 0.4 | 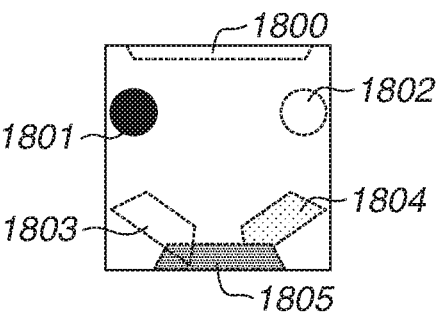 |

INFORMATION PROCESSING APPARATUS, INFORMATION PROCESSING METHOD, AND STORAGE MEDIUM FOR IMAGE DISPLAY AND VIRTUAL LIGHT SOURCE REPRESENTATION

BACKGROUND

Field

One disclosed aspect of the embodiments relates to an information processing apparatus that adds a lighting effect provided by a virtual light source to a captured image.

Description of the Related Art

A technique for executing virtual lighting processing to add a virtual lighting effect to a captured image has heretofore been known. Japanese Patent Application Laid-Open No. 2018-010497 discusses a technique in which a user sets parameters representing, for example, a position and a light intensity of a virtual light source, to an operation object representing a light source (the object is hereinafter referred to as a light source object) and adds a lighting effect provided by the virtual light source to an image. According to this technique, the light source object is displayed in a superimposed manner on a captured image, and parameters associated with the virtual light source are changed in response to a user operation on the light source object. In this case, the parameters associated with the virtual light source are changed in conjunction with a display state, such as a display position or a size of the light source object, thereby enabling the user to adjust a lighting state while visually recognizing the position and the light intensity of the virtual light source.

In the related art, the lighting effect to be added to the captured image is not changed unless a user operation is performed on the light source object. Accordingly, if the user is unfamiliar with operating an information processing apparatus including a function for operating the light source object, the user may be unaware of being able to cause a change in the lighting effect by operation of the light source object.

SUMMARY

One aspect of the embodiments is directed to providing an information processing apparatus that enables a user to easily recognize a change in a lighting effect due to an operation on a light source object.

An information processing apparatus according to an aspect of the embodiments includes a display unit configured to display a captured image and an object representing a state of a virtual light source, a change unit configured to change the object and change the state of the virtual light source based on an elapsed time, and an adding unit configured to add a lighting effect to the captured image, the lighting effect being provided by the virtual light source the state of which has been changed by the change unit.

Further features of the disclosure will become apparent from the following description of exemplary embodiments with reference to the attached drawings.

BRIEF DESCRIPTION OF THE DRAWINGS

FIGS. 2A and 2B each illustrate an appearance of the information processing apparatus according to the first exemplary embodiment.

FIGS. 10A to 10D each illustrate an example of a change in a light source object parameter based on an elapsed time according to the second exemplary embodiment.

FIG. 18 illustrates an example of a state of a light source object according to the fifth exemplary embodiment.

DESCRIPTION OF THE EMBODIMENTS

Exemplary embodiments of the disclosure will be described below with reference to the accompanying drawings. The following exemplary embodiments are not intended to limit the disclosure. Not all combinations of features described in the exemplary embodiments are essential for the disclosure.

<Hardware Configuration of Information Processing Apparatus 1>

Figure 1A:
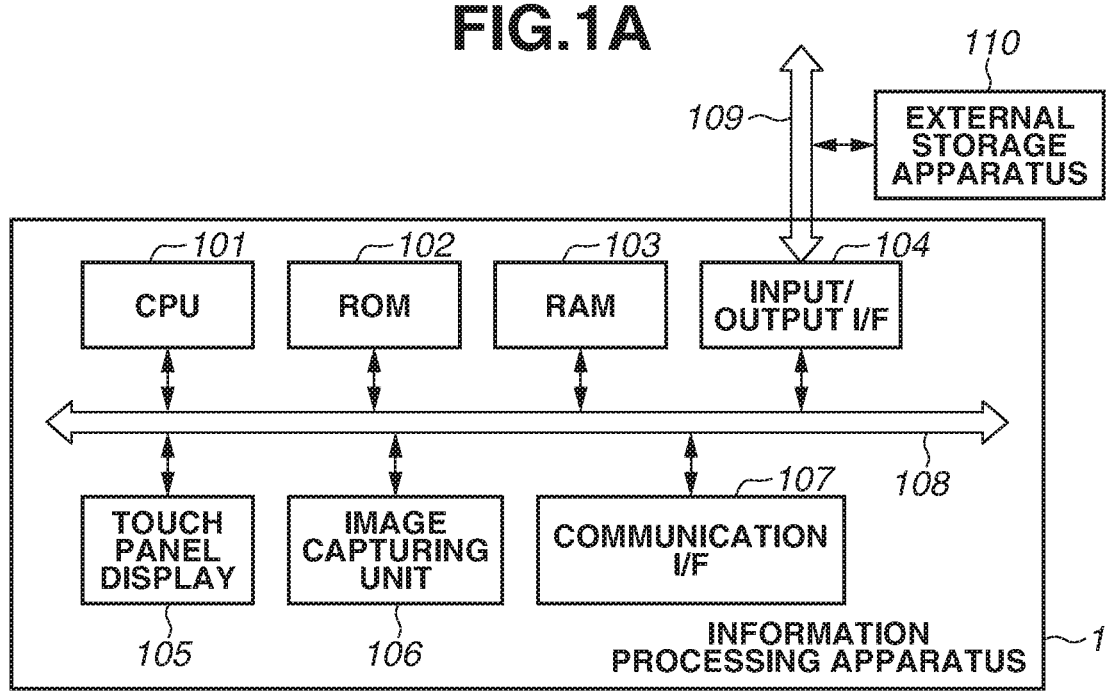
FIGS. 1A and 1B are block diagrams each illustrating a hardware configuration example of an information processing apparatus according to a first exemplary embodiment.

A first exemplary embodiment will be described. FIG. 1A is a block diagram illustrating a hardware configuration example of an information processing apparatus 1 according to the first exemplary embodiment. The information processing apparatus 1 is implemented by an apparatus including a communication function and an image capturing function, such as a smartphone or a tablet personal computer (PC). The information processing apparatus 1 includes a central processing unit (CPU) 101, a read-only memory (ROM) 102, a random access memory (RAM) 103, an input/output interface (I/F) 104, a touch panel display 105, an image capturing unit 106, and a communication I/F 107. The CPU 101 uses the RAM 103 as a work memory and executes an operating system (OS) and various programs stored in the ROM 102, an external storage apparatus 110, or the like. The OS and various programs may be stored in an internal storage apparatus. Further, the CPU 101 controls each component via a system bus 108. Processing to be performed according to flowcharts to be described below is implemented by loading the program codes or instructions stored in the ROM 102 and the external storage apparatus 110 into the RAM 103 and executing the loaded program codes by the CPU 101. The program codes or instructions, when executed by the CPU 101, may cause the CPU 101 to perform operations described in the following such as displaying, changing, and adding. The input/output I/F 104 is connected with the external storage apparatus 110 via a serial bus 109. The external storage apparatus 110 is a hard disk drive (HDD). The touch panel display 105 is an input/output unit having a configuration in which a display for displaying images and a touch panel for detecting a position of a touch by an indicator, such as a finger, are integrally formed. The image capturing unit 106 is an image capturing unit that acquires an image of an imaging subject. FIGS. 2A and 2B each illustrate an example of an appearance of the information processing apparatus 1 according to the present exemplary embodiment. FIG. 2A illustrates a surface including the touch panel display 105 of the information processing apparatus 1 (the surface is hereinafter referred to as a display surface). FIG. 2B illustrates a surface (hereinafter referred to as a rear surface) opposite to the display surface of the information processing apparatus 1. The image capturing unit 106 according to the present exemplary embodiment includes a main camera 202 that is provided on the rear surface of the information processing apparatus 1, and an in-camera 201 that is provided on the display surface of the information processing apparatus 1. The in-camera 201 is installed in a position and a direction in which an image of the face of a user who intends to browse a display (display screen) can be captured. The communication I/F 107 establishes a wired or wireless bidirectional communication with another information processing apparatus or communication apparatus, another external storage apparatus, or the like. The communication I/F 107 according to the present exemplary embodiment can transmit and receive data to and from a communication partner via a wireless local area network (LAN). The communication I/F 107 can establish not only a direct communication with another communication apparatus, but also an indirect communication with another communication apparatus via a relay apparatus.

<Logical Configuration of Information Processing Apparatus 1>

Figure 3A:
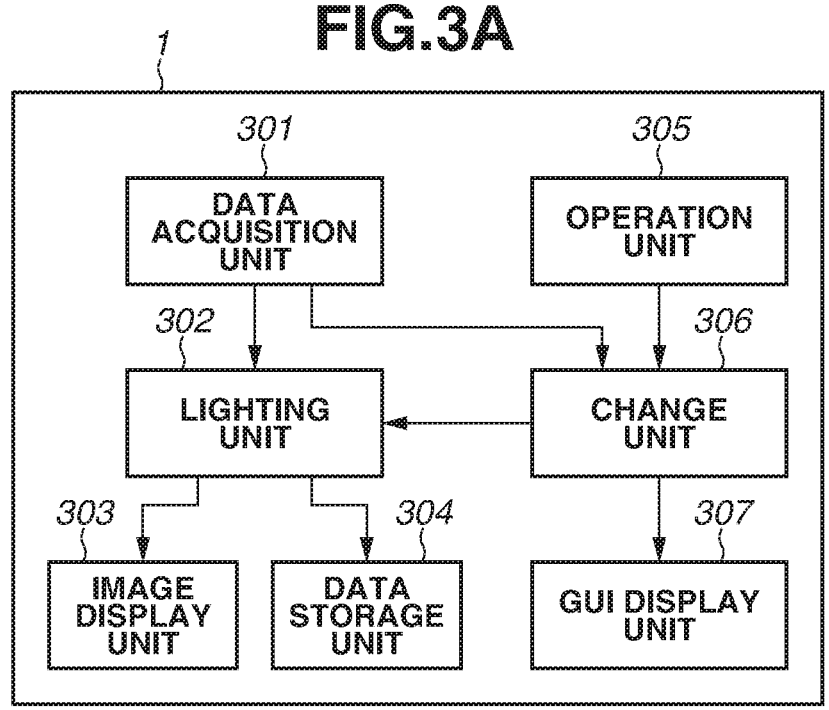
FIGS. 3A and 3B are block diagrams each illustrating a logical configuration example of the information processing apparatus according to the first exemplary embodiment.

A logical configuration example of the information processing apparatus 1 will be described. FIG. 3A is a block diagram illustrating a logical configuration example of the information processing apparatus 1 according to the present exemplary embodiment. The information processing apparatus 1 uses the RAM 103 as a work memory and the CPU 101 executes programs stored in the ROM 102, thereby enabling the information processing apparatus 1 to function as the logical configuration illustrated in FIG. 3A. Not all processes described below necessarily have to be executed by the CPU 101. The information processing apparatus 1 may be configured in such a manner that some or all of the processes are performed by one or more processing circuits other than the CPU 101.

The information processing apparatus 1 includes a data acquisition unit 301, a lighting unit 302, an image display unit 303, a data storage unit 304, an operation unit 305, a change unit 306, and a graphical user interface (GUI) display unit 307.

The data acquisition unit 301 acquires, from the image capturing unit 106, a captured image as input image data. The data acquisition unit 301 also acquires an initial value of a virtual light source parameter and an initial value of a light source object parameter from the ROM 102, the external storage apparatus 110, or the like. The virtual light source parameter is a parameter representing a state of a virtual light source used when a lighting effect is added to an image. Examples of the virtual light source parameter include a position, a direction, an irradiation angle, an intensity, a distribution curve, and the number of the virtual light sources. The light source object parameter is a parameter representing a state of a light source object. Examples of the light source object parameter include a position, a direction, a size, a brightness, a color, a degree of transmission, a shape, and the number of the light source objects. Here, the initial values of the parameters described above are preliminarily stored in the ROM 102, the external storage apparatus 110, or the like. If the image capturing unit 106 includes a plurality of image capturing modes, such as a portrait mode and a macro mode, the value corresponding to the image capturing mode for capturing an input image may be acquired from initial values provided for each image capturing mode. The acquired input image data and the initial value of the virtual light source parameter are sent to the lighting unit 302. The initial value of the light source object parameter is sent to the change unit 306.

The lighting unit 302 determines the virtual light source parameter based on the light source object parameter. Further, the lighting unit 302 generates image data to which the lighting effect provided by the virtual light source is added (the image data is hereinafter referred to as lighting image data) by using the virtual light source parameter. This processing will be described in detail below. The generated lighting image data is sent to the image display unit 303 and the data storage unit 304.

The image display unit 303 outputs the lighting image data to the touch panel display 105 and displays the output lighting image data.

The data storage unit 304 stores and saves the lighting image data in the external storage apparatus 110.

The operation unit 305 receives input information indicating a user operation (the information is hereinafter referred to as operation information) via the touch panel display 105. Information corresponding to the light source object in the received operation information is sent to the change unit 306.

The change unit 306 determines the light source object parameter based on an operation on the light source object or based on an elapsed time. This processing will be described in detail below. The determined light source object parameter is sent to the lighting unit 302 and the GUI display unit 307.

The GUI display unit 307 renders a GUI including the light source object based on the light source object parameter, and outputs and displays the GUI on the touch panel display 105.

Figure 5:
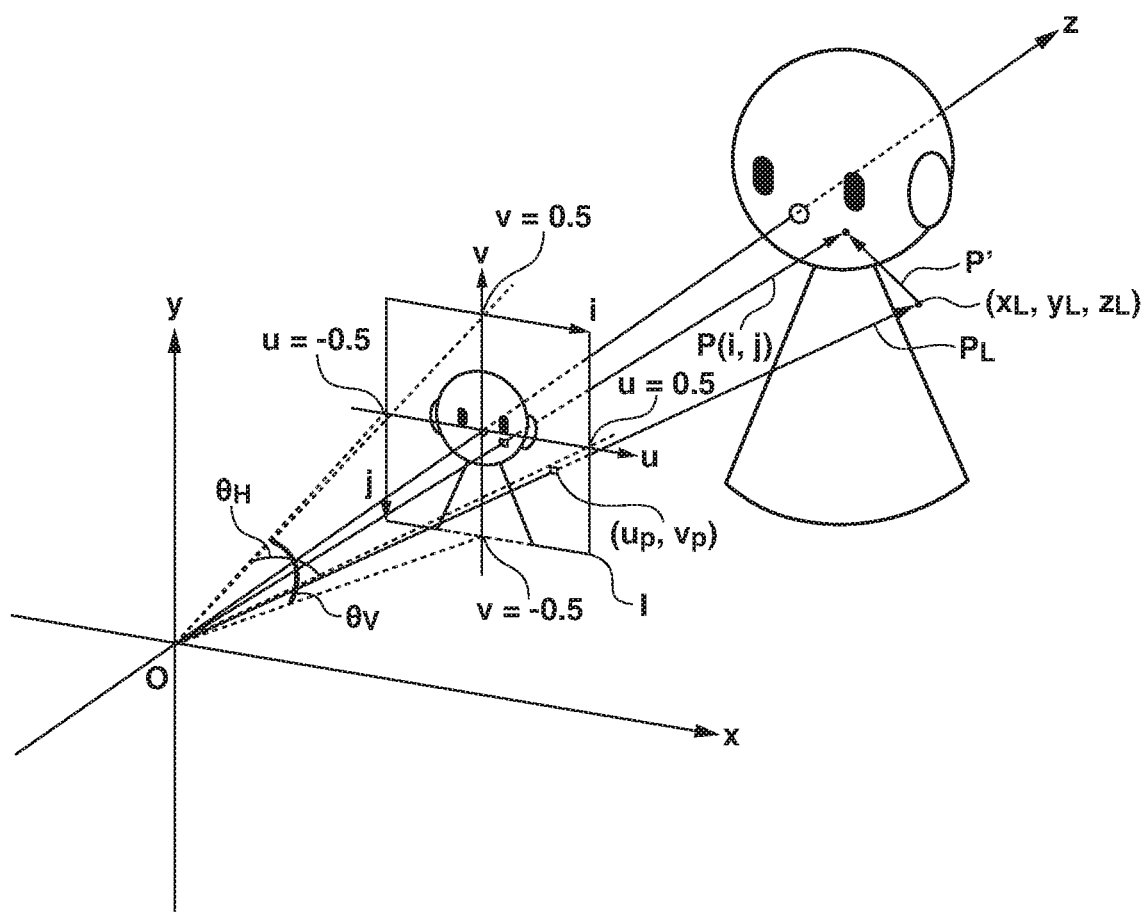
FIG. 5 illustrates a coordinate system according to the first exemplary embodiment.

FIG. 5 is a schematic diagram illustrating coordinate systems (an ij-plane coordinate system, a uv-plane coordinate system, and an xyz-space coordinate system) used in the present exemplary embodiment. The ij-plane coordinate system is a two-dimensional coordinate system in which an upper left corner of an input image I is set as an origin, a horizontally rightward direction is set as an i-axis, and a vertically downward direction is set as a j-axis. A pixel indicated by position coordinates (i, j) on an image is expressed as a "pixel (i, j)". The uv-plane coordinate system is a two-dimensional coordinate system in which the center of the input image I is set as an origin, the direction that matches the i-axis is set as an u-axis, and the direction opposite to the j-axis is set as a v-axis. Assume that "u" and "v" are normalized in such a manner that the image has a horizontal width "1" and a vertical width "1". The xyz-space coordinate system is a three-dimensional coordinate system in which an optical center O of a camera that has captured the input image I is set as an origin, the direction that matches the u-axis is set as an x-axis, the direction that matches the v-axis is set as a y-axis, and the direction from a front side (camera side) to a back side (subject side) in a depth direction (i.e., an optical axis direction of the camera) is set as a z-axis. In the description below, a three-dimensional position vector $P_L=(x_L, y_L, z_L)$, a virtual light attenuation rate $F_L(P')$, and a virtual light RGB intensity $(Ir_L, Ig_L, Ib_L)$ of the virtual light source are used as virtual light source parameters. In this case, P' represents a three-dimensional position vector with the position of the virtual light source as an origin, and $F_L(P')$ represents an attenuation rate $(0<F_L(P')<1)$ when light emitted from the virtual light source reaches the point indicated by the position vector P'. Position coordinates $(u_p, v_p)$ of the light source object in the uv-plane coordinate system and a brightness $S_p$ of the light source object are used as light source object parameters. Hereinafter, the virtual light source parameters are collectively represented by $Q_L$ $\{P_L, F_L(P'), (Ir_L, Ig_L, Ib_L)\}$), and the light source object parameters are collectively represented by $q_L$ $(=\{(u_p, v_p), S_p\})$.

<Details of Lighting Processing>

Lighting processing to be performed by the lighting unit 302 will be described in detail. First, a unit normal vector representing a direction of a subject surface for each pixel of the input image is acquired. Various known shape estimation techniques can be used to acquire the normal vector. For example, the normal vector may be estimated based on shading of the input image, or may be estimated by applying a shape model, which is prepared in advance, to a subject in the input image. Alternatively, a camera capable of acquiring an image as well as depth information about an imaging subject may be used as the image capturing unit 106 and a normal line may be calculated based on the depth information obtained from the camera. The method for acquiring the normal vector is not a focus of the disclosure, and thus the detailed description thereof is omitted.

Next, a virtual reflection intensity obtained when a subject is irradiated with light from the virtual light source is calculated based on the virtual light source parameter and the normal vector to the subject surface. In the present exemplary embodiment, virtual reflection intensities $(Ir_D(i, j), Ig_D(i, j), Ib_D(i, j))$ are calculated according to the following equations for each pixel (i, j) of the input image.

$$\begin{pmatrix} Ir_D(i,j) \\ Ig_D(i,j) \\ Ib_D(i,j) \end{pmatrix} = \begin{cases} F(P(i,j)-P_L)* \\ \begin{pmatrix} Ir_L*Ir(i,j) \\ Ig_L*Ig(i,j) \\ Ib_L*Ib(i,j) \end{pmatrix} *L(i,j)\cdot N(i,j), & \text{if } L(i,j)\cdot N(i,j) > 0 \quad (1) \\ \begin{pmatrix} 0 \\ 0 \\ 0 \end{pmatrix} & \text{, otherwise} \end{cases}$$

$$L(i,j) = \frac{P_L - P(i,j)}{|P_L - P(i,j)|} \quad (2)$$

In Equations (1) and (2), P(i, j) represents a three-dimensional position vector of a subject included in the pixel (i, j) in the input image. This position vector P(i, j) is desirably acquired for each pixel by, for example, calculating the position vector P(i, j) based on depth information about the subject and the angle of view of the image capturing unit 106. Alternatively, in order to facilitate the processing, a constant value (e.g., $P(i, j)=(0, 0, d_p)$ where $d_p$ is a constant) that is determined independently of the pixel position may be used. RGB values of the pixel (i, j) in the input image are represented by (Ir(i, j), Ig(i, j), Ib(i, j)). L(i, j) represents a light source vector from the subject to the virtual light source. N(i, j) represents a normal vector to the subject surface for the pixel (i, j). If the attenuation rate and the pixel value of the input image are constant, the value of the virtual reflection intensity obtained by Equation (1) increases as an angle θ formed between the normal vector and the light source vector decreases. When θ=0 holds (i.e., when the subject surface faces the direction of light entering from the virtual light source), the virtual reflection intensity has a maximum value.

The virtual reflection intensity calculated as described above is added to the RGB values of the input image according to the following equation, thereby generating lighting image data.

$$\begin{pmatrix} I'r(i,j) \\ I'g(i,j) \\ I'b(i,j) \end{pmatrix} = \begin{pmatrix} Ir(i,j)+Ir_D(i,j) \\ Ig(i,j)+Ig_D(i,j) \\ Ib(i,j)+Ib_D(i,j) \end{pmatrix} \quad (3)$$

In Equation (3), (I'r(i, j), I'g(i, j), I'b(i, j)) represent RGB values at the pixel (i, j) in the lighting image.

In the case of calculating the virtual reflection intensity, not only the reflection represented by Equation (1), but also reflection characteristics unique to the subject, such as gloss, shading, and the like may be taken into consideration. In addition, various reflection models generally used in computer graphics can be used. The above-described processing makes it possible to add the lighting effect to the subject in the captured image.

<Processing to be Executed by Information Processing Apparatus 1>

Figure 4:
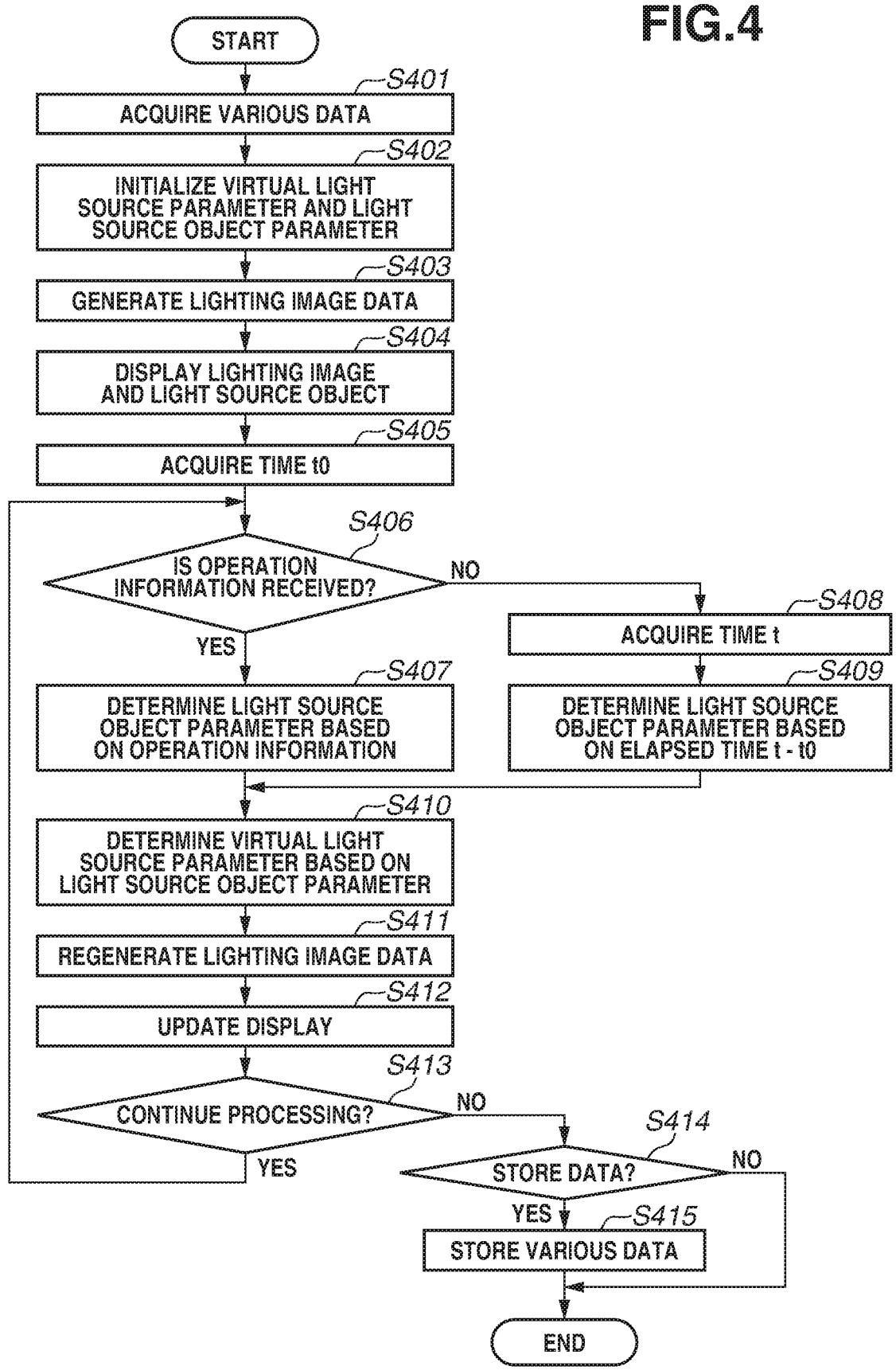
FIG. 4 is a flowchart illustrating a flow of processing to be executed by the information processing apparatus according to the first exemplary embodiment.

FIG. 4 is a flowchart illustrating a flow of processing to be executed by the information processing apparatus 1. In the following description, each step is denoted by "S" followed by a number.

In step S401, the data acquisition unit 301 acquires input image data, an initial parameter $Q_{L0}=\{P_{L0}, F_{L0}(P'), (Ir_{L0}, Ig_{L0}, Ib_{L0})\}$ of the virtual light source, and an initial parameter $q_{L0}=\{(u_{p0}, v_{p0}), S_{p0}\}$ of the light source object. Specific examples of the initial parameters are described below.

(Initial Parameter $Q_{L0}$ of Virtual Light Source)

The position vector $P_{L0}$ of the virtual light source=(0, 0, $d_{L0}$) ($d_{L0}$ is a constant)·the attenuation rate $F_{L0}(P')$ of virtual light=$1/|P'|^2$ The virtual light RGB intensity ($Ir_{L0}$, $Ig_{L0}$, $Ib_{L0}$)=(0.5, 0.5, 0.5) (the initial parameter $q_{L0}$ of the light source object)

The position coordinates ($u_{p0}$, $v_{p0}$) of the light source object=(0, 0)·the brightness $S_{p0}$ of the light source object=0.5

In step S402, the lighting unit 302 and the change unit 306 initialize each of the virtual light source parameter $Q_L$ and the light source object parameter $q_L$ by using the initial parameters $Q_{L0}$ and $q_{L0}$ acquired in step S401. Specifically, the lighting unit 302 sets the virtual light source parameter $Q_L=Q_{L0}$ and the change unit 306 sets the light source object parameter $q_L=q_{L0}$.

In step S403, the lighting unit 302 adds the lighting effect to the input image data acquired in step S401 by using the virtual light source parameter $Q_L$ initialized in step S402, thereby generating lighting image data.

Figure 6A:
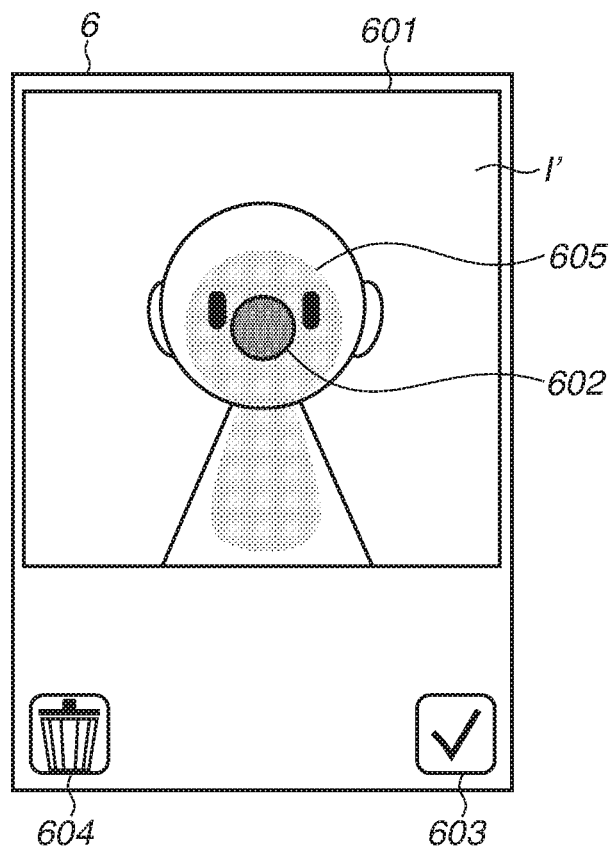
FIGS. 6A and 6B each illustrate an example of a graphical user interface (GUI) and a lighting image according to the first exemplary embodiment.

In step S404, the GUI display unit 307 displays a GUI including the light source object on the touch panel display 105. Further, the image display unit 303 displays the lighting image generated in step S403 in a predetermined area on the GUI. FIG. 6A illustrates an example of the GUI. A lighting image I' is displayed in an image display area 601 on a GUI 6. A light source object 602 is displayed in a superimposed manner on the lighting image I' displayed in the image display area 601 based on the light source object parameter $q_L$ (=$q_{L0}$) initialized in step S402. The lighting image I' illustrated in FIG. 6A is an image of the subject irradiated with virtual light from the front side of the subject. The light source object 602 is displayed in a superimposed manner at the center of the lighting image I'. In FIG. 6A, a shaded portion 605 represents a portion where brightness is increased due to the lighting effect provided by the virtual light source. In the drawings on which the following description is based, a shaded portion with a darker color indicates a brighter portion.

In step S405, the change unit 306 acquires the current time and stores the acquired current time as a start time $t_0$ when virtual lighting processing is started.

In step S406, the operation unit 305 receives information about a user operation on the light source object displayed in step S404. The information about the user operation on the light source object is information about an operation such as a tap operation (single-tap, double-tap, or long tap), a drag operation, a flick operation, or a pinch-in/pinch-out operation on the light source object displayed on the touch panel display 105. If the information about the operation on the light source object is received (YES in step S406), the processing proceeds to step S407. In the other cases (NO in step S406), the processing proceeds to step S408.

In step S407, the change unit 306 determines the value of the light source object parameter $q_L$ based on the operation information received in step S406. For example, when a drag operation is performed on the light source object, the position coordinates ($u_p$, $v_p$) of the light source object are changed by an amount corresponding to a movement of a touch position by the drag operation. When a tap operation is performed on the light source object, the brightness $S_p$ of the light source object is changed. In the case of changing the brightness, the brightness is changed in a plurality of predetermined levels of gradation in a cyclic manner each time a tap operation is made. Alternatively, when a tap operation is performed, a slider may be displayed and this slider may be operated by the user to change the brightness. The association between the operation information and the content of a change in various parameters is not limited to the example described above. In another example, the brightness may be increased or decreased by a pinch-in/pinch-out operation on the light source object, or the brightness may be switched between $S_p=0$ and $S_p \neq 0$ every time the tap operation is performed on the light source object.

In step S408, the change unit 306 acquires the current time and stores the acquired current time as a current time t.

In step S409, the change unit 306 determines the value of the light source object parameter $q_L$ (i.e., the position coordinates ($u_p$, $v_p$) of the light source object and the brightness $S_p$) based on an elapsed time $\Delta t_0$ (=$t-t_0$) from the start time $t_0$ to the current time t. Herein, $u_p$ (=$f_u(\Delta t_0)$), $v_p$ (=$f_v(\Delta t_0)$), and $S_p$ (=$f_S(\Delta t_0)$) represent values that are obtained by substituting $\Delta t=\Delta t_0$ into functions $f_u(\Delta t)$, $f_v(\Delta t)$, and $f_S(\Delta t)$, respectively, of an elapsed time $\Delta t$ to be described below.

$$f_u(\Delta t)=\alpha_{u1}*\sin(\alpha_{u2}*\Delta t) \tag{4}$$

$$f_v(\Delta t)=\alpha_{v1}*\sin(\alpha_{v2}*\Delta t) \tag{5}$$

$$f_S(\Delta t)=\alpha_{S1}*\sin(\alpha_{S2}*\Delta t)+0.5 \tag{6}$$

Figure 7A:
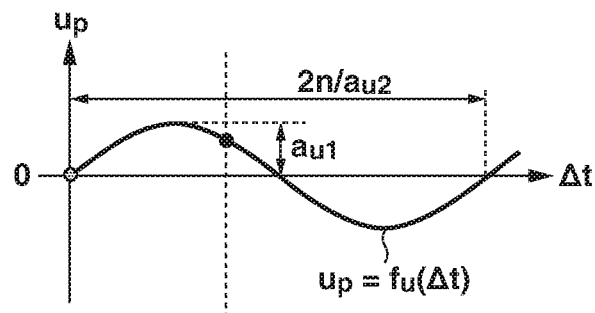
FIGS. 7A to 7D are graphs each illustrating an example of a change of a light source object parameter based on an elapsed time according to the first exemplary embodiment.
Figure 7B:
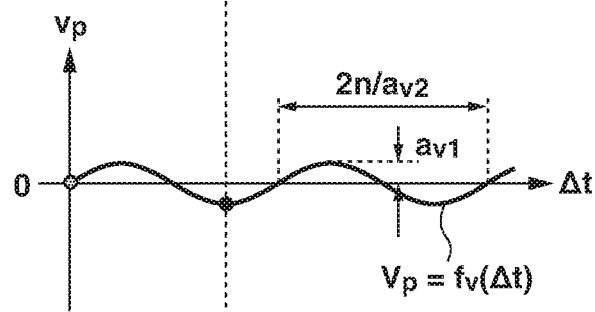
Figure 7C:
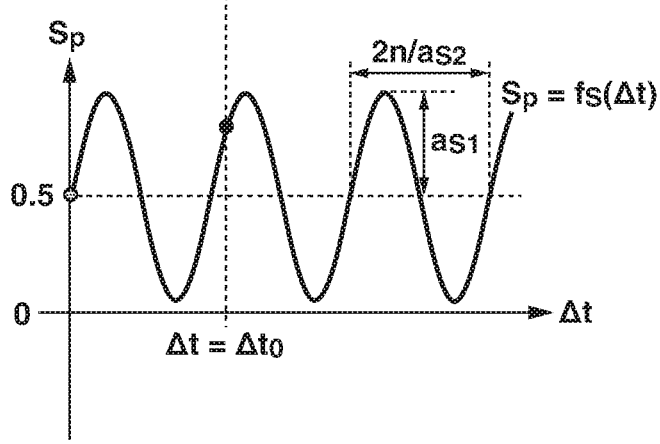
Figure 7D:
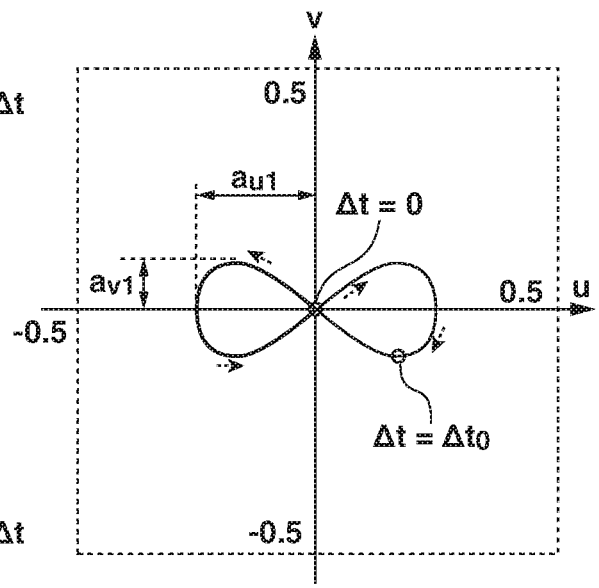

In Equations (4), (5), and (6), $a_{u1}$ and $a_{v1}$ are coefficients each representing a fluctuating range of a position in each axis direction of the uv-plane coordinate system, $a_{s1}$ is a coefficient representing a fluctuating range of the brightness, and $a_{u2}$, $a_{v2}$, and $a_{S2}$ are coefficients each representing a cycle of a fluctuation in position or brightness in a time axis direction. FIGS. 7A to 7D are graphs each illustrating an example of the relationship between the elapsed time and the value of the light source object parameter. FIGS. 7A to 7C are graphs illustrating $u_p$, $v_p$, and $S_p$, which are determined by Equations (4) to (6), respectively, and FIG. 7D illustrates a locus of the position coordinates ($u_p$, $v_p$) of the light source object on the uv-plane in this case. Functions used for calculating the parameter values are not limited to the above-described examples (Equations (4) to (6)), but instead any function can be used as long as the function is a function for the elapsed time $\Delta t_0$. Instead of using the functions, the value of the light source object parameter may be determined by referring to a look-up table (LUT) in which the elapsed time $\Delta t_0$ is associated with each parameter value.

In step S410, the lighting unit 302 determines the virtual light source parameter $Q_L$ based on the light source object parameter $q_L$ determined in step S407 or S409. In the present exemplary embodiment, the position vector $P_L$ and the RGB intensity ($Ir_L$, $Ig_L$, $Ib_L$) of the virtual light source included in the virtual light source parameter $Q_L$ are determined according to the following equations based on the light source object parameter $q_L=\{(u_p, v_p), S_p\}$.

$$P_L = \begin{pmatrix} x_L \\ y_L \\ z_L \end{pmatrix} = \begin{pmatrix} 2*u_p*z_{L0}*\tan\left(\frac{\theta_H}{2}\right) \\ 2*v_p*z_{L0}*\tan\left(\frac{\theta_V}{2}\right) \\ z_{L0} \end{pmatrix} \tag{7}$$

$$\begin{pmatrix} Ir_L \\ Ig_L \\ Ib_L \end{pmatrix} = S_p * \begin{pmatrix} Ir_{L0} \\ Ig_{L0} \\ Ib_{L0} \end{pmatrix} \tag{8}$$

In Equations (7) and (8), $\theta_H$ and $\theta_V$ represent a horizontal angle of view and a vertical angle of view, respectively, of the camera that has captured the input image.

In step S411, the lighting unit 302 regenerates the lighting image data by using the virtual light source parameter $Q_L$ determined in step S410.

Figure 6B:
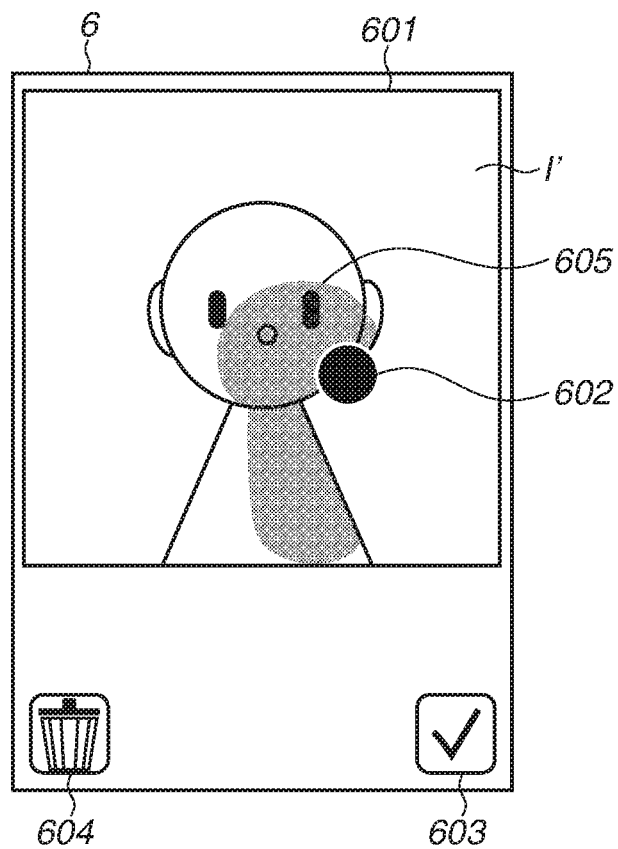

In step S412, the image display unit 303 updates the display of the lighting image data. Specifically, the image display unit 303 displays the lighting image data regenerated in step S411 by overwriting the image display area 601 on the GUI 6 displayed in step S404 with the lighting image data. Further, the GUI display unit 307 renders the light source object 602 again in the image display area 601 based on the light source object parameter $q_L$ determined in step S407 or S409. FIG. 6B illustrates an example of the updated GUI. FIG. 6B illustrates an example in which the light source object parameter is determined based on the elapsed time $\Delta t_0$ in step S409. The position and brightness of the light source object 602 illustrated in FIG. 6B are changed from those illustrated in FIG. 6A. The position and brightness of the portion 605 irradiated with virtual light are also changed accordingly.

In step S413, the operation unit 305 receives user operation information via the GUI displayed in step S404, and determines whether to continue the processing. Specifically, when a determination button 603 or a cancel button 604 on the GUI 6 is pressed, it is determined to terminate the processing (NO in step S413) and then the processing proceeds to step S414. In the other cases, it is determined to continue the processing (YES in step S413) and then the processing returns to step S406.

In step S414, the operation unit 305 determines whether to store the lighting image data based on the operation information received in step S413. Specifically, if the determination button 603 is pressed in step S413, it is determined to store the data (YES in step S414) and then the processing proceeds to step S415. If the cancel button 604 is pressed in step S413, it is determined not to store the data (NO in step S414) and then the processing is terminated.

In step S415, the data storage unit 304 stores the lighting image data regenerated in step S411, and then the processing is terminated.

Advantageous Effects of First Exemplary Embodiment

As described above, the information processing apparatus 1 according to the present exemplary embodiment changes the state of the light source object on the GUI based on the elapsed time, adds the lighting effect provided by the virtual light source to an image based on the state of the light source object, and displays the image. This configuration makes it possible to easily recognize the relationship between the light source object and the light effect to be added.

In the present exemplary embodiment, the data acquisition unit 301 acquires the input image data from the image capturing unit 106, but instead may acquire image data stored in the external storage apparatus 110 or the like as the input image data.

The data acquisition unit 301 acquires the initial value of the virtual light source parameter and the initial value of the light source object parameter, which are stored in advance. However, these initial values may be determined based on the type, position, size, or the like of a subject in the input image. For example, an in-focus area or an area in which the face of a person is included may be extracted as a main subject area, and the initial position vector $P_{L0}$ of the virtual light source and the initial position coordinates $(u_{p0}, v_{p0})$ of the light source object may be determined based on the central position and size of the main subject area. Alternatively, the values of the virtual light source parameter and the light source object parameter, which are previously set, may be stored and used as the initial values.

The data storage unit 304 may store the lighting image data and the virtual light source parameter in association with each other.

While the position coordinates and the brightness of the light source object are used as light source object parameters in the present exemplary embodiment, only one of the position coordinates and the brightness of the light source object may be used. If only the position coordinates are used, in step S410, only the position vector for the virtual light source may be determined based on Equation (7) and the RGB intensity of the virtual light source may be maintained constant at the initial value. If only the brightness is used, only the RGB intensity of the virtual light source may be determined based on Equation (8) and the position vector for the virtual light source may be maintained constant at the initial value.

Figure 8A:
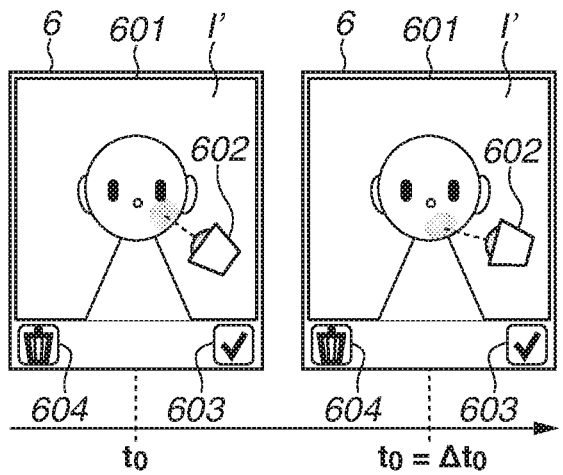
FIGS. 8A to 8E each illustrate an example of a change in the GUI and the lighting image according to the first exemplary embodiment.
Figure 8B:
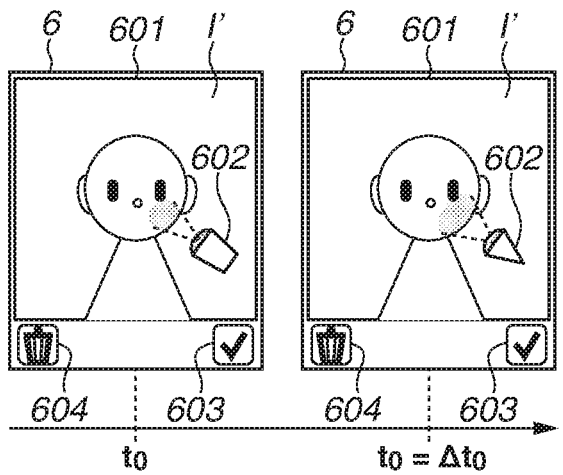

While the virtual light source is a point light source having no directionality in the present exemplary embodiment, a light source having a directionality, such as a spotlight, may be used. In this case, the optical axis direction and the degree of the irradiation angle of the virtual light source may be added as virtual light source parameters, and the direction and shape of the light source object may be used as light source object parameters. Specifically, the direction of the light source object is determined in step S407 or S409, and the optical axis direction of the virtual light source is determined in step S410 based on the direction. Alternatively, the shape of the light source object is determined in step S407 or S409, and the degree of the irradiation angle of the virtual light source is determined in step S410 based on the shape. FIGS. 8A and 8B each illustrate an example of a change in the GUI and the lighting image in this case.

Figure 8C:
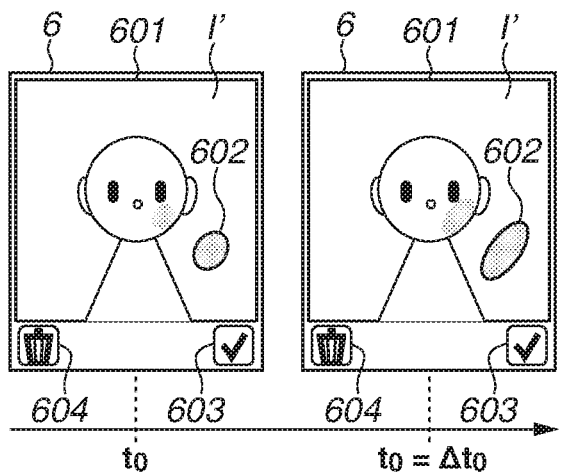

Further, a surface light source may be used as the virtual light source. In this case, the size and shape of the surface of the virtual light source may be added as virtual light source parameters, and the size and shape of the light source object may be used as light source object parameters. Specifically, the size and shape of the light source object are determined in step S407 or S409, and the size and shape of the surface of the virtual light source are determined in step S410 based on the size and shape of the light source object. FIG. 8C illustrates an example of a change in the GUI and the lighting image in this case.

Figure 8D:
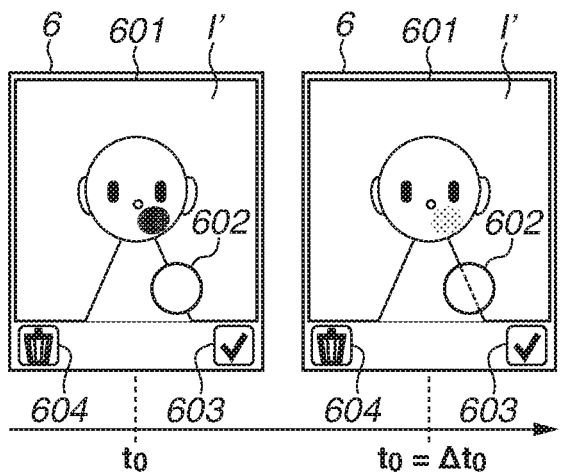

In the present exemplary embodiment, the RGB intensity of the virtual light source is determined based on the brightness of the light source object, but instead may be determined based on another light source object parameter. FIG. 8D illustrates an example of a change in the GUI and the lighting image when the RGB intensity of the virtual light source is determined based on the degree of transmission of the light source object. In an example illustrated in FIG. 8D, the light source object 602 which is opaque at the time $t_0$ becomes translucent at a time $t_0+\Delta t_0$. The brightness of the portion irradiated with virtual light decreases in accordance with this change.

Figure 8E:
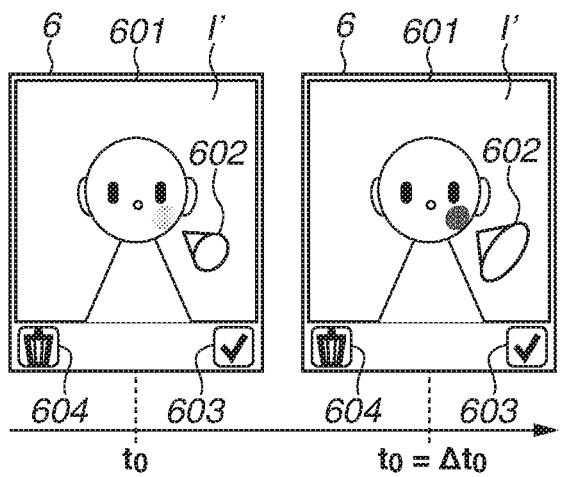

The brightness of the virtual light source may be determined based on the size of the light source object. In an example illustrated in FIG. 8E, the brightness of the portion irradiated with virtual light increases as the size of the light source object increases.

Further, the type of the light source, such as a point light source or a surface light source, may be added to the virtual light source parameters, and shapes representing various types of light sources may be used as light source object parameters. Specifically, the shape of the light source object is determined in step S407 or S409, and the type of the virtual light source is determined in step S410 based on the shape. In this case, in step S411, the virtual reflection intensity may be calculated based on reflection models based on the type of the light source, to thereby generate the lighting image data. The method for calculating the reflection intensity based on various reflection models is not a focus of the disclosure, and thus the detailed description thereof is omitted.

In the present exemplary embodiment, the lighting image data is generated by calculating the virtual reflection intensity based on the virtual light source parameter and the normal vector to the subject surface. However, the method for generating the lighting image data is not limited to this example. For example, relationships between the virtual light source parameters and the obtained lighting image may be learned based on various image data obtained by capturing images of the subject under a known light source, and the lighting image data may be generated based on the learning result.

In the first exemplary embodiment, the state of the light source object is changed based on the elapsed time from the time when the virtual lighting processing is started. In a second exemplary embodiment, the state of the light source object is changed by also taking into consideration an elapsed time from a time when an operation is performed. A hardware configuration of the information processing apparatus 1 according to the second exemplary embodiment is similar to that of the information processing apparatus 1 according to the first exemplary embodiment, and thus the description thereof is omitted. Differences between the second exemplary embodiment and the first exemplary embodiment will be mainly described below. Components in the second exemplary embodiment that are identical to those in the first exemplary embodiment are denoted by the same reference numerals.

<Logical Configuration of Information Processing Apparatus 1>

The logical configuration of the information processing apparatus 1 according to the second exemplary embodiment is similar to that of the information processing apparatus 1 according to the first exemplary embodiment (FIG. 3A).

<Processing to be Executed by Information Processing Apparatus 1>

Figure 9:
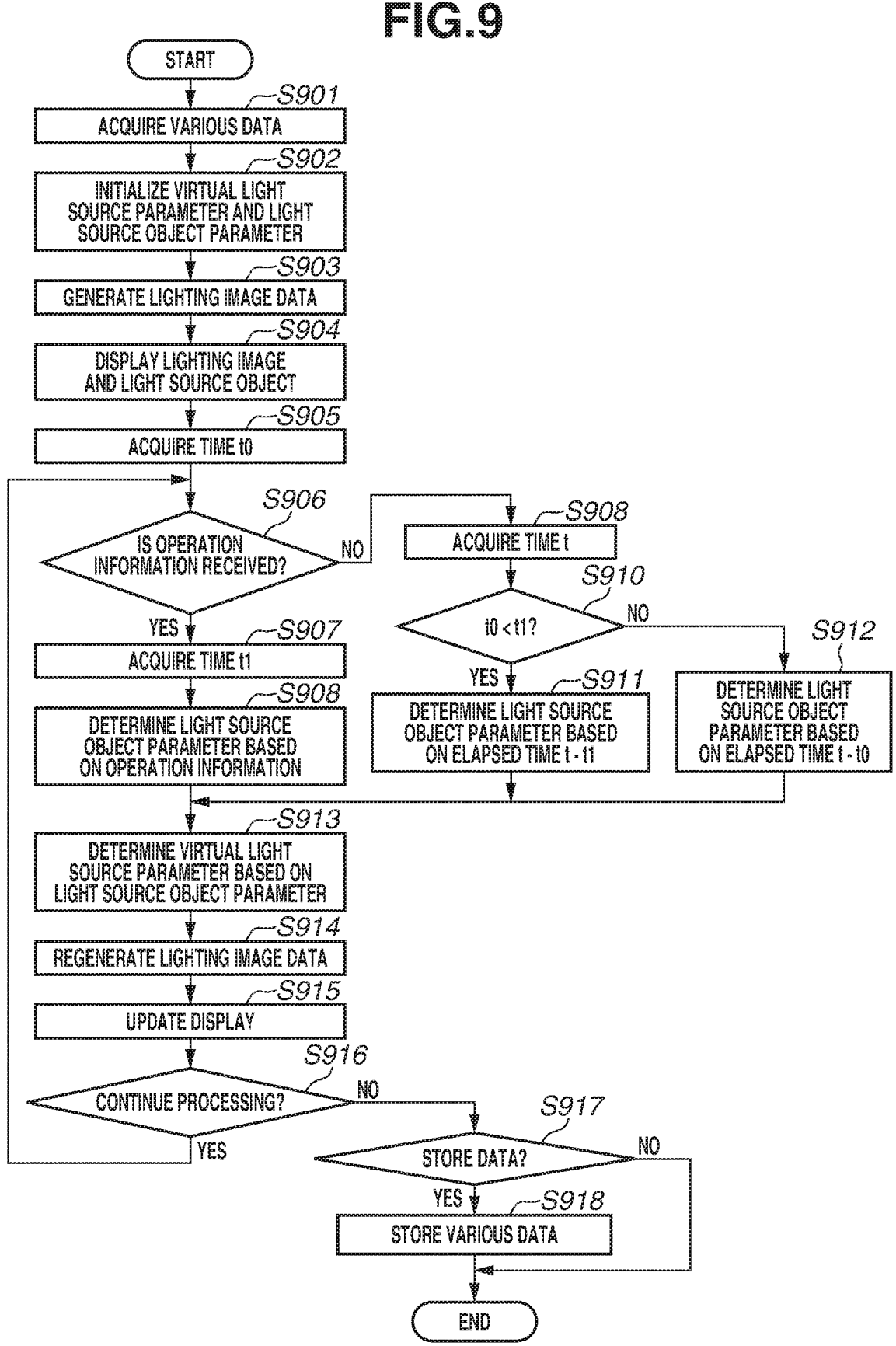
FIG. 9 is a flowchart illustrating a flow of processing to be executed by an information processing apparatus according to a second exemplary embodiment.

FIG. 9 is a flowchart illustrating a flow of processing to be executed by the information processing apparatus 1 according to the second exemplary embodiment. The virtual light source parameter $Q_L$ and the light source object parameter $q_L$ according to the second exemplary embodiment are represented by $Q_L=\{P_L, F_L(P'), (Ir_L, Ig_L, Ib_L)\}$, $q_L=\{(u_p, v_p), S_p\}$, like in the first exemplary embodiment.

The processes of steps S901 to S906 are similar to the processes of steps S401 to S406, respectively, and thus the descriptions thereof are omitted.

In step S907, the change unit 306 acquires the current time, and stores the acquired current time as a time $t_1$ when an operation is performed. The time $t_1$ is initialized with a sufficiently small value (e.g., a negative constant) $t_m$ in advance, and $t_1=t_m$ holds until step S907 is executed.

The processes of steps S908 and S909 are similar to the processes of steps S407 and S408, respectively, and thus the descriptions thereof are omitted.

In step S910, the change unit 306 compares the start time $t_0$ with the time $t_1$ when the operation is performed, and determines whether a user operation is performed after the time when the virtual lighting processing is started. Specifically, when $t_0<t_1$ holds, it is determined that the operation is performed (YES in step S910) and then the processing proceeds to step S911. In other cases, it is determined that no operation is performed (NO in step S910) and then the processing proceeds to step S912.

In step S911, the change unit 306 determines the value of the light source object parameter $q_L$ based on the elapsed time $\Delta t_1$ (=$t-t_1$) from the time $t_1$ when the operation is performed to the current time t. In the present exemplary embodiment, displacements $\Delta u_p$ and $\Delta v_p$ of the light source object corresponding to the elapsed time $\Delta t_1$ and a brightness change amount $\Delta S_p$ are acquired by referring to the LUT illustrated in FIG. 10A, and the position coordinates $(u_p, v_p)$ and the brightness $S_p$ of the light source object are calculated according to the following equation using the displacements $\Delta u_p$ and $\Delta v_p$ and the brightness change amount $\Delta S_p$.

$$\begin{cases} \begin{pmatrix} u_p \\ v_p \end{pmatrix} = \begin{pmatrix} u_{p1} + \Delta u_p \\ v_{p1} + \Delta v_p \end{pmatrix} \\ S_p = S_{p1} + \Delta S_p \end{cases} \quad (9)$$

In Equation (9), $(u_{p1}, v_{p1})$ and $S_{p1}$ respectively represent the position coordinates and the brightness of the light source object which are determined in step S908 (i.e., obtained after the user operation is performed). FIG. 10B illustrates a locus of the position coordinates $(u_p, v_p)$ of the light source object on the uv-plane.

In step S912, the change unit 306 determines the value of the light source object parameter $q_L$ based on the elapsed time $\Delta t_0$ from the time when the virtual lighting processing is started to the current time (like in step S409). In the present exemplary embodiment, the displacements $\Delta u_p$ and $\Delta v_p$ of the light source object corresponding to the elapsed time $\Delta t_0$ and the brightness change amount $\Delta S_p$ are acquired by referring to the LUT illustrated in FIG. 10C, and the position coordinates $(u_p, v_p)$ and the brightness $S_p$ of the light source object are calculated according to the following equation using the displacements $\Delta u_p$ and $\Delta v_p$ and the brightness change amount $\Delta S_p$.

$$\begin{cases} \begin{pmatrix} u_p \\ v_p \end{pmatrix} = \begin{pmatrix} u_{p0} + \Delta u_p \\ v_{p0} + \Delta v_p \end{pmatrix} \\ S_p = S_{p0} + \Delta S_p \end{cases} \quad (10)$$

FIG. 10D illustrates a locus of the position coordinates $(u_p, v_p)$ of the light source object on the uv-plane in this case.

The processes of steps S913 to S918 are similar to the processes of steps S410 to S415, respectively, and thus the descriptions thereof are omitted.

Figure 11A:
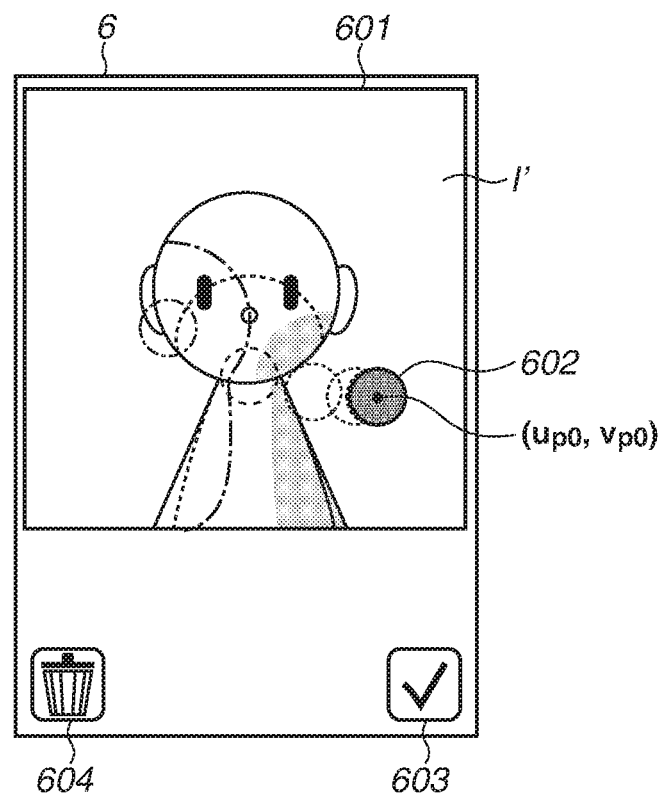
FIGS. 11A and 11B each illustrate a GUI and a lighting image according to the second exemplary embodiment.
Figure 11B:
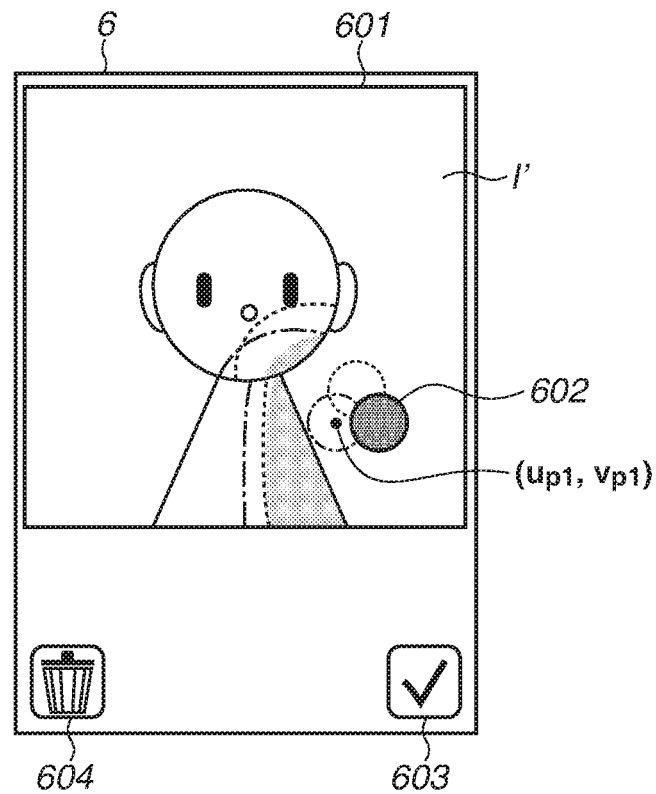

FIGS. 11A and 11B each illustrate an example of the operation of the GUI according to the present exemplary embodiment. FIG. 11A illustrates a state of the GUI from the time $t_0$ when the virtual lighting processing is started to the time $t_1$ when the user operates the light source object. During the period from the time $t_0$ to the time $t_1$, the state of the light source object 602 is changed based on the elapsed time $\Delta t_0$ from the start time. Specifically, the light source object 602 moves on the locus illustrated in FIG. 10D while the brightness is changed based on the LUT illustrated in FIG. 10C. Then, after a lapse of a certain period (1.3 [s] in an example illustrated in FIG. 10C) before the user operates the light source object, the light source object 602 remains at the initial position coordinates ($u_{p0}$, $v_{p0}$) with a constant brightness (=$S_{p0}$). In addition, the lighting effect to be added based on the state of the light source object 602 is sequentially reflected in the lighting image I'. FIG. 11B illustrates a state of the GUI after the light source object is operated at the time $t_1$. FIG. 11B illustrates an example of the state after the light source object 602 is dragged from the position coordinates ($u_{p0}$, $v_{p0}$) to the position coordinates ($u_{p1}$, $v_{p1}$). After the time $t_1$, the state of the light source object 602 changes based on the elapsed time $\Delta t_1$ from the time when an operation is performed. Specifically, after a lapse of a certain period (10.0 [s] in an example illustrated in FIG. 10A), the light source object moves on the locus illustrated in FIG. 10B while the brightness is changed based on the LUT illustrated in FIG. 10A. Then, the lighting effect to be added based on the state of the light source object 602 is sequentially reflected in the lighting image I'. If an operation is performed again on the light source object after the time $t_1$, the time is regarded as a new time $t_1$. Further, the state of the light source object changes based on the elapsed time from the new time $t_1$ (i.e., the time when an operation is performed again), and the lighting image is also changed in accordance with this change.

Advantageous Effects of Second Exemplary Embodiment

As described above, the information processing apparatus 1 according to the present exemplary embodiment changes the state of the light source object by taking into consideration not only the elapsed time from the time when the virtual lighting processing is started, but also the elapsed time from the time when an operation is performed. This makes it possible to present, to the user, examples of the operation to be performed on the light source object and the lighting effect, if the user is uncertain about the operation to be performed and thus a user operation is not received for a certain period.

In the present exemplary embodiment, the LUT in which the value of the light source object parameter is constant after a lapse of a certain period is used in step S912. However, an LUT in which the value of the light source object parameter is changed again after a lapse of a specific period may also be used. The LUT used in step S911 may be the same as the LUT used in step S912.

In a third exemplary embodiment, the state of the light source object is changed based on an elapsed time from a time when a change in the status of the information processing apparatus 1, such as a change in the position or orientation of the information processing apparatus 1, occurs. In the third exemplary embodiment, a change in the position/orientation of the information processing apparatus 1 will be mainly described. However, the state of the light source object may be changed based on, for example, a time when a predetermined operation is performed on the information processing apparatus 1 (a button for implementing a predetermined function of the information processing apparatus 1 is pressed). A hardware configuration of the information processing apparatus 1 according to the third exemplary embodiment is similar to that of the information processing apparatus 1 according to the first exemplary embodiment.

<Logical Configuration of Information Processing Apparatus 1>

Figure 3B:
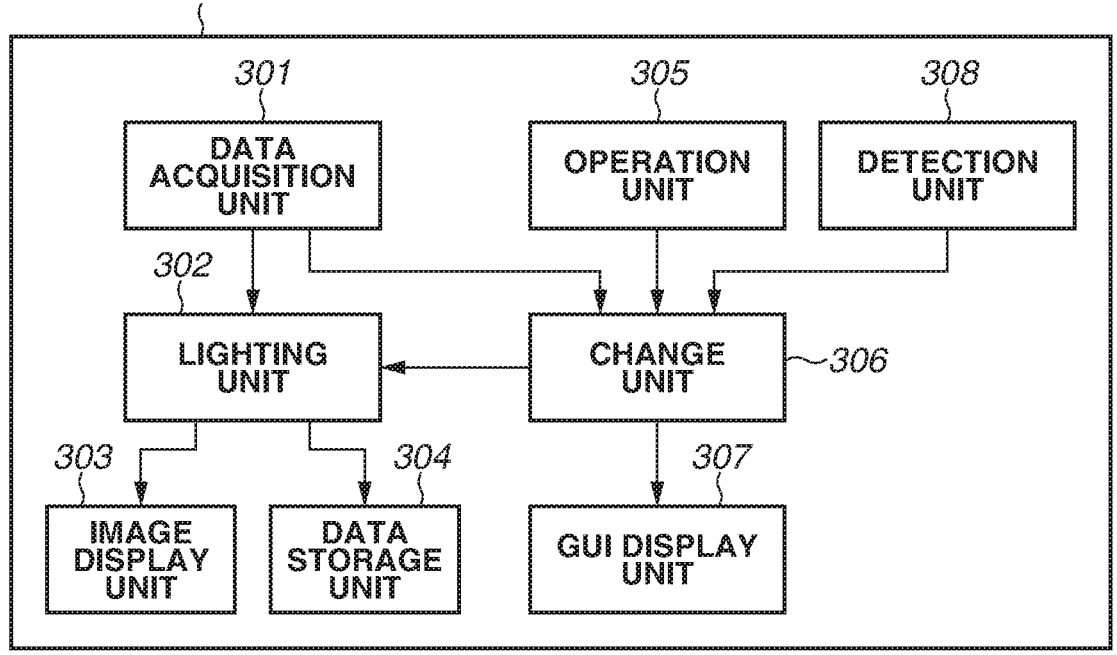

FIG. 3B is a block diagram illustrating a logical configuration example of the information processing apparatus 1 according to the present exemplary embodiment. The information processing apparatus 1 includes the data acquisition unit 301, the lighting unit 302, the image display unit 303, the data storage unit 304, the operation unit 305, the change unit 306, the GUI display unit 307, and a detection unit 308.

The detection unit 308 detects a change in the status of the information processing apparatus 1. The present exemplary embodiment illustrates an example in which a change in the position or direction of the information processing apparatus 1 is detected as a status change. The detection unit 308 according to the present exemplary embodiment sequentially acquires captured image data in chronological order from the image capturing unit 106. Further, a difference between image data acquired at the current time and image data acquired at a preceding time is calculated every time captured image data is acquired. If the difference is greater than or equal to a predetermined threshold, it is determined that the position or direction of the information processing apparatus 1 has changed. As the difference between image data, for example, a mean square error or a mean absolute error of pixel values can be used. The detection result is sequentially sent to the change unit 306.

The data acquisition unit 301, the lighting unit 302, the image display unit 303, the data storage unit 304, the operation unit 305, the change unit 306, and the GUI display unit 307 are similar to those described in the first exemplary embodiment, and thus the descriptions thereof are omitted.

<Processing to be Executed by the Information Processing Apparatus 1>

Figure 12:
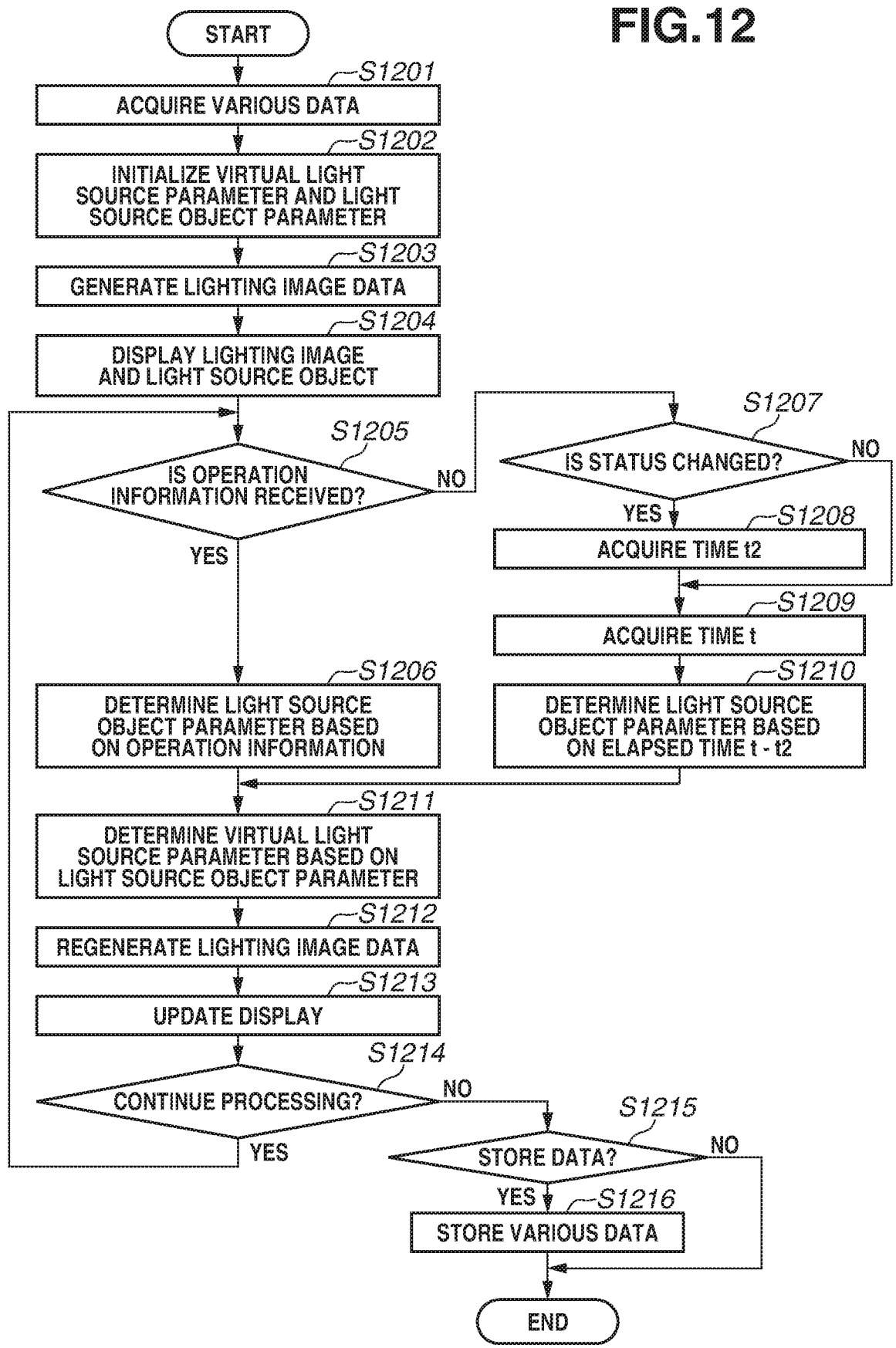
FIG. 12 is a flowchart illustrating a flow of processing to be executed by an information processing apparatus according to a third exemplary embodiment.

FIG. 12 is a flowchart illustrating a flow of processing to be executed by the information processing apparatus 1 according to the third exemplary embodiment. The virtual light source parameter $Q_L$ and the light source object parameter $q_L$ according to the present exemplary embodiment are represented by $Q_L=\{P_L, F_L(P'), (Ir_L, Ig_L, Ib_L)\}$, $q_L=\{(u_p, v_p), S_p\}$, like in the first exemplary embodiment.

The processes of steps step S1201 to step S1204, step S1205, and step S1206 are similar to the processes of steps S401 to S404, S406, and 407, respectively, and thus the descriptions thereof are omitted.

In step S1207, the change unit 306 determines whether the status associated with the information processing apparatus 1 has changed based on the detection result sent from the detection unit 308. In a case where a change in the status is detected (YES in step S1207), the processing proceeds to step S1208. In other cases (NO in step S1207), the processing proceeds to step S1209.

In step S1208, the change unit 306 acquires the current time and stores the acquired current time as a time $t_2$ when the status associated with the information processing apparatus 1 has changed.

The process of step S1209 is similar to the process of step S408, and thus the description thereof is omitted.

In step S1210, the change unit 306 determines the value of the light source object parameter $q_L$ based on an elapsed time $\Delta t_2$ ($=t-t_2$) from the time $t_2$ when the status associated with the information processing apparatus 1 has changed to the current time t. In the present exemplary embodiment, the displacements $\Delta u_p$ and $\Delta v_p$ and the change amount $\Delta S_p$ of each parameter corresponding to the elapsed time $\Delta t_2$ are calculated according to the following equations, and the position coordinates ($u_p$, $v_p$) and the brightness $S_p$ of the light source object are determined using the calculated displacements $\Delta u_p$ and $\Delta v_p$ and the change amount $\Delta S_p$.

$$\begin{cases} \begin{pmatrix} \Delta u_p \\ \Delta v_p \end{pmatrix} = \begin{pmatrix} -a_{uv1} * e^{-\gamma_{uv} * \Delta t_2} * \sin(a_{uv2} * \Delta t_2) * \cos\theta_{uv} \\ -a_{uv1} * e^{-\gamma_{uv} * \Delta t_2} * \sin(a_{uv2} * \Delta t_2) * \sin\theta_{uv} \end{pmatrix} \\ \Delta S_p = a_{S3} * e^{-\gamma_S * \Delta t_2} * |\sin(a_{S4} * \Delta t_2)| \end{cases} \quad (11)$$

$$\begin{cases} \begin{pmatrix} u_p \\ v_p \end{pmatrix} = \begin{pmatrix} u_{p2} + \Delta u_p \\ v_{p2} + \Delta v_p \end{pmatrix} \\ S_p = S_{p2} + \Delta S_p \end{cases} \quad (12)$$

Figure 13A:
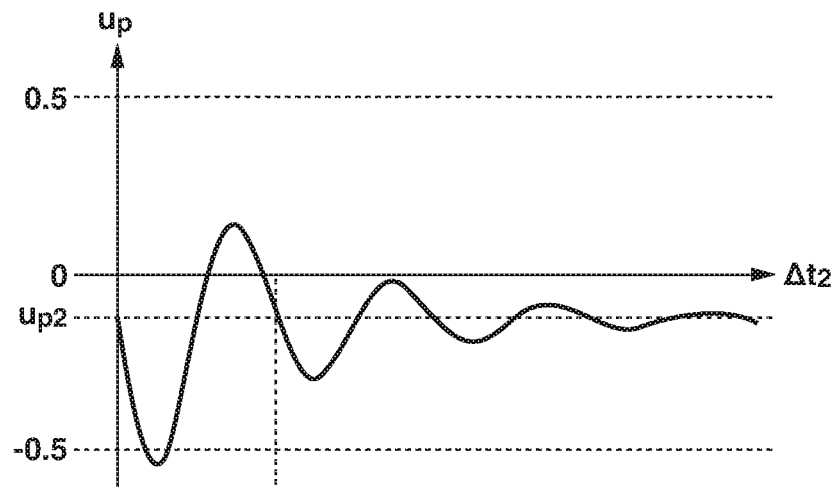
FIGS. 13A, 13B, and 13C are graphs each illustrating an example of a change of a light source object parameter based on an elapsed time according to the third exemplary embodiment.
Figure 13B:
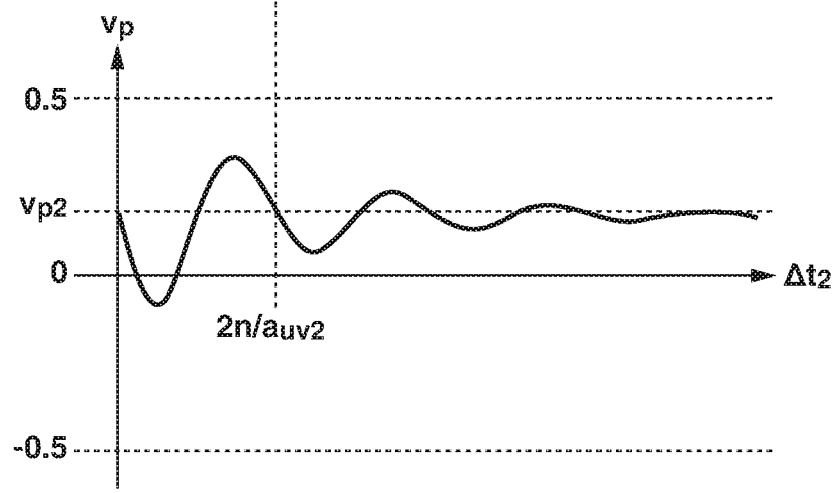
Figure 13C:
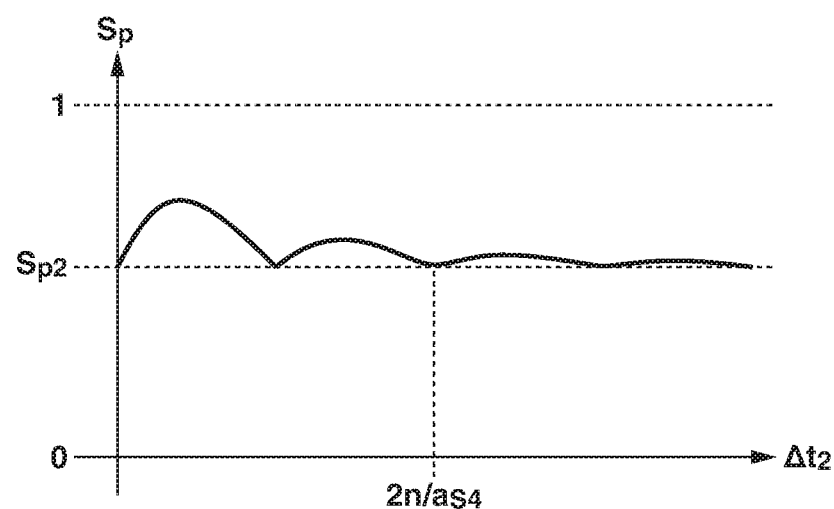

In equations (11) and (12), $\theta_{uv}$ is an angle representing a fluctuation direction of the position of the light source object; $a_{uv1}$, $a_{uv2}$, and $\gamma_{uv}$ are coefficients representing a fluctuating range, a fluctuation cycle, and an attenuation of fluctuation, respectively, at each position; $a_{S3}$, $a_{S4}$, and $\gamma_S$ are coefficients representing a fluctuating range, a fluctuation cycle, and an attenuation of fluctuation, respectively, of the brightness; and ($u_{p2}$, $v_{p2}$) and $S_{p2}$ represent the position coordinates and the brightness, respectively, of the light source object at the time $t_2$. FIGS. 13A to 13C are graphs illustrating $u_p$, $v_p$, and $S_p$, respectively, which are determined by Equation (12). In this case, the light source object vibrates in a damped manner in a straight line with inclination of $\theta_{uv}$ on the uv-plane. The value of $\theta_{uv}$ may be a predetermined constant, or may be an inclination of a direction of gravitational force detected using an acceleration sensor or the like.

The processes of steps S1211 to S1216 are similar to the processes of steps S410 to S415, respectively, and thus the descriptions thereof are omitted.

Figure 14A:
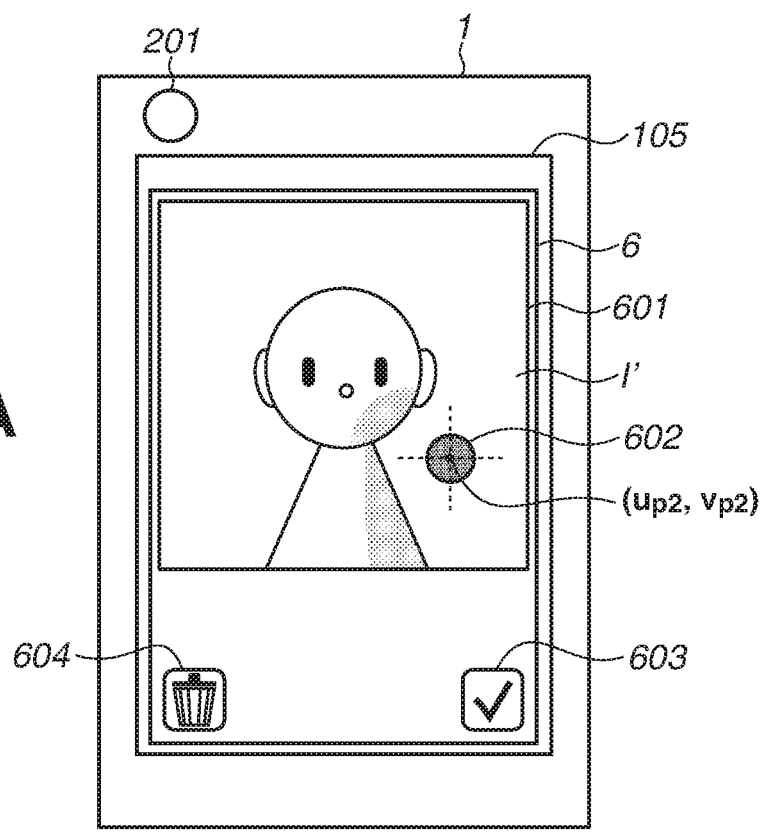
FIGS. 14A and 14B each illustrate an example of a GUI and a lighting image according to the third exemplary embodiment.
Figure 14B:
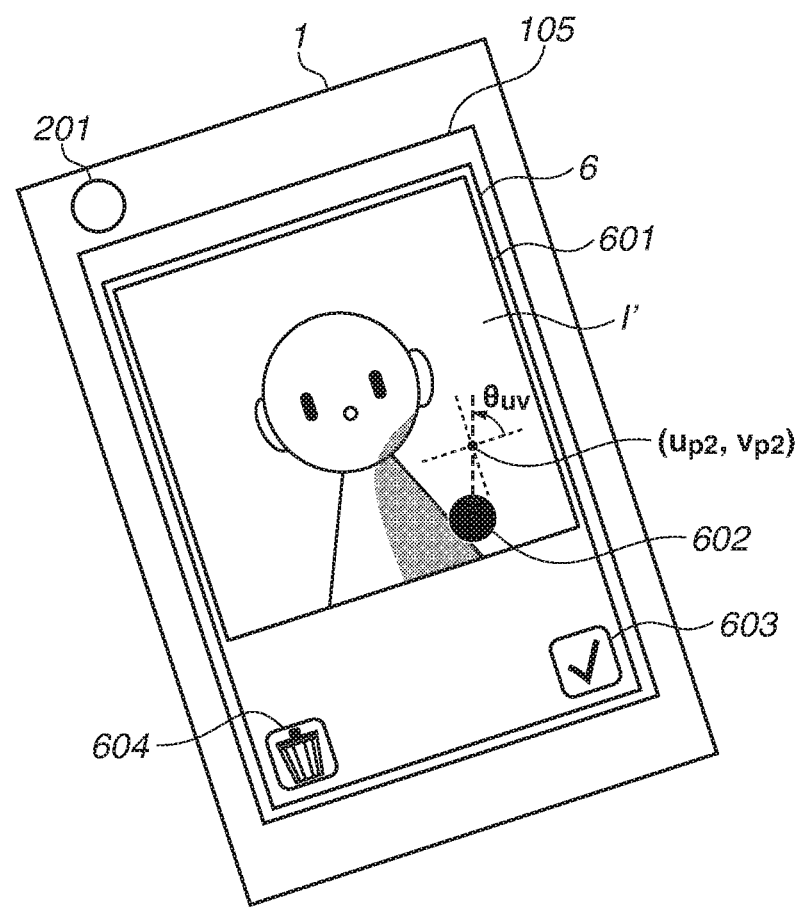

FIGS. 14A and 14B each illustrate an operation of the GUI according to the present exemplary embodiment. FIGS. 14A and 14B each illustrate an example in which the information processing apparatus 1 is inclined at a certain time. FIG. 14A illustrates the information processing apparatus 1 and the GUI immediately before the information processing apparatus 1 is inclined. FIG. 14B illustrates the information processing apparatus 1 and the GUI when a period corresponding to $\Delta t_2$ has elapsed after the information processing apparatus 1 is inclined. FIG. 14B illustrates that the position of the light source object 602 is moved in the direction of gravitational force from the state illustrated in FIG. 14A, and the brightness is also changed. The position and brightness of the portion irradiated with virtual light are also changed in accordance with this change.

Advantageous Effects of Third Exemplary Embodiment

As described above, the information processing apparatus 1 according to the present exemplary embodiment changes the state of the light source object based on the elapsed time from the time when a change occurs in the status associated with the information processing apparatus 1. This makes it possible to attract the line of sight of the user to the light source object when the status associated with the information processing apparatus 1 is changed, and to implicitly present, to the user, information indicating that the lighting effect can be changed by operating the light source object.

The detection unit 308 may include an acceleration sensor, a gyroscope sensor, and a geomagnetic sensor, and may detect a change in the position or direction of the information processing apparatus 1 based on outputs from the sensors.

Further, the detection unit 308 may estimate a change in the position/orientation of the image capturing unit 106 by using a known camera position/orientation estimation method based on a plurality of captured images acquired in chronological order from the image capturing unit 106, and may detect this change as a change in the status associated with the information processing apparatus 1.

Upon receiving input information, such as a touch operation or a gesture by the user, the detection unit 308 may determine that the status associated with the information processing apparatus 1 has changed.

In a fourth exemplary embodiment, the lighting image and the GUI are displayed separately. A hardware configuration of the information processing apparatus 1 according to the fourth exemplary embodiment is similar to that of the information processing apparatus 1 according to the first exemplary embodiment.

<Logical Configuration of Information Processing Apparatus 1>

The logical configuration of the information processing apparatus 1 according to the fourth exemplary embodiment is similar to that of the information processing apparatus 1 according to the first exemplary embodiment (FIG. 3A).

<Processing to be Executed by Information Processing Apparatus 1>

A flow of processing to be executed by the information processing apparatus 1 according to the fourth exemplary embodiment is similar to that according to the first exemplary embodiment (FIG. 4), except for the method of displaying the GUI and the lighting image in steps S404 and S412. The virtual light source parameter $Q_L$ and the light source object parameter $q_L$ according to the present exemplary embodiment are represented by $Q_L=\{P_L, F_L(P'), (Ir_L, Ig_L, Ib_L)\}$, $q_L=\{(u_p, v_p), S_p\}$, like in the first exemplary embodiment. Here, the uv-plane coordinate system according to the present exemplary embodiment is a two-dimensional system in which the center of the image display area in the GUI is set as an origin, the horizontally rightward direction is set as the u-axis, and the vertically upward direction is set as the v-axis. Also, "u" and "v" are normalized in such a manner that the image display area has a horizontal width "1" and a vertical width "1".

In step S404, the GUI display unit 307 displays the GUI including the light source object on the touch panel display 105. The image display unit 303 displays the lighting image, which is generated in step S403, separately from the GUI on the touch panel display 105.

In step S412, the GUI display unit 307 renders the light source object 602 again in the image display area 601 based on the light source object parameter $q_L$ determined in step S407 or S409. Further, the image display unit 303 displays the lighting image data by overwriting the lighting image displayed separately from the GUI in step S404 with the lighting image data regenerated in step S411.

Figure 15:
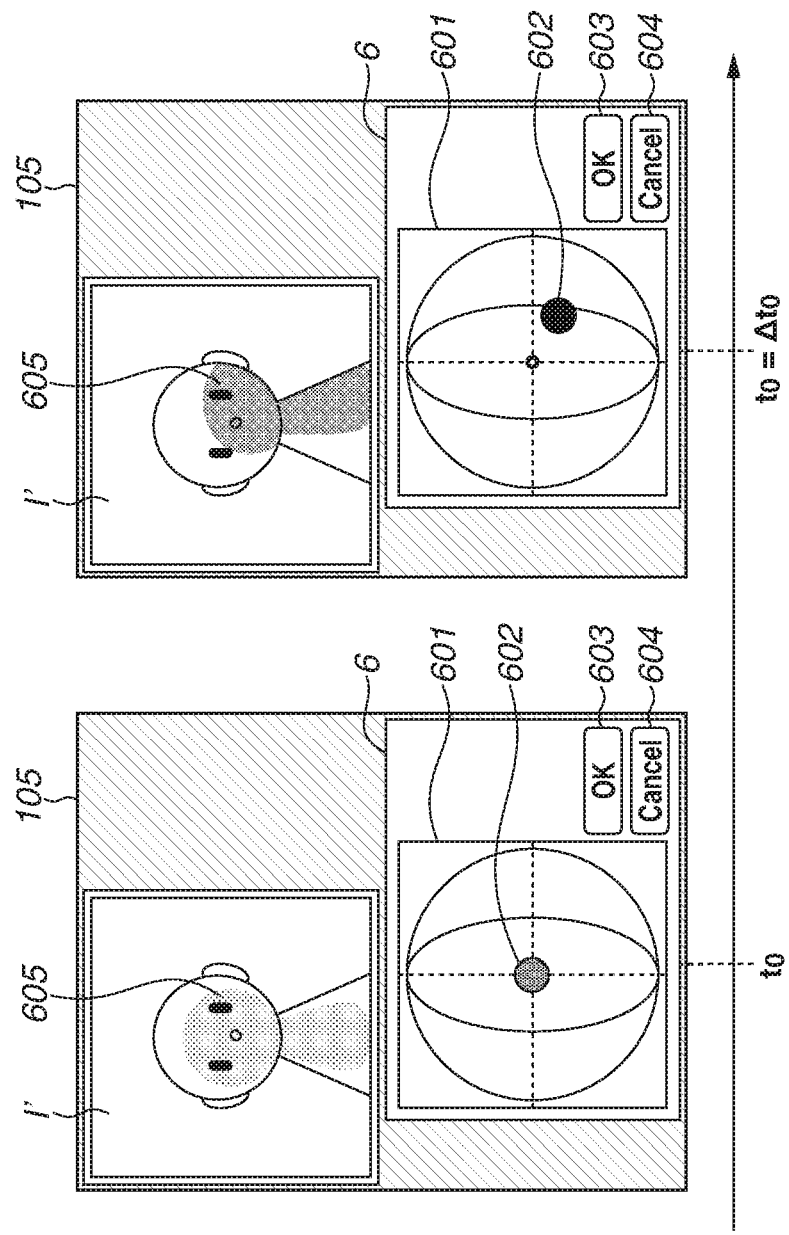
FIG. 15 illustrates an example of a change in a GUI and a lighting image according to a fourth exemplary embodiment.

FIG. 15 illustrates an example of a change in the GUI and the lighting image according to the present exemplary embodiment. The light source object 602 is displayed in the image display area 601 on the GUI 6. The lighting image I' is displayed separately from the GUI 6 on the touch panel display 105. Since the GUI and the lighting image are displayed separately, even when the virtual light source is positioned in front of the subject at the time $t_0$, the subject in the lighting image can be confirmed without being hidden by the light source object 602. To facilitate the recognition of the position of the virtual light source, a guide image may be displayed in the image display area 601. In an example illustrated in FIG. 15, the point corresponding to the optical center of the camera that has captured the input image, or an image depicting a circle having the point as the center is displayed as the guide image.

Advantageous Effects of Fourth Exemplary Embodiment

As described above, the information processing apparatus 1 according to the present exemplary embodiment displays the lighting image and the GUI separately. In this way, the lighting image can be confirmed without being hidden by the light source object.

A fifth exemplary embodiment illustrates an example in which a light source object and a lighting image are displayed while a plurality of predetermined patterns of the state of the virtual light source is changed based on an elapsed time. A hardware configuration of the information processing apparatus 1 according to the fifth exemplary embodiment is similar to that of the information processing apparatus 1 according to the first exemplary embodiment.

<Logical Configuration of Information Processing Apparatus 1>

The logical configuration of the information processing apparatus 1 according to the fifth exemplary embodiment is similar to that of the information processing apparatus 1 according to the first exemplary embodiment (FIG. 3A).

<Processing to be Executed by Information Processing Apparatus 1>

Figure 16:
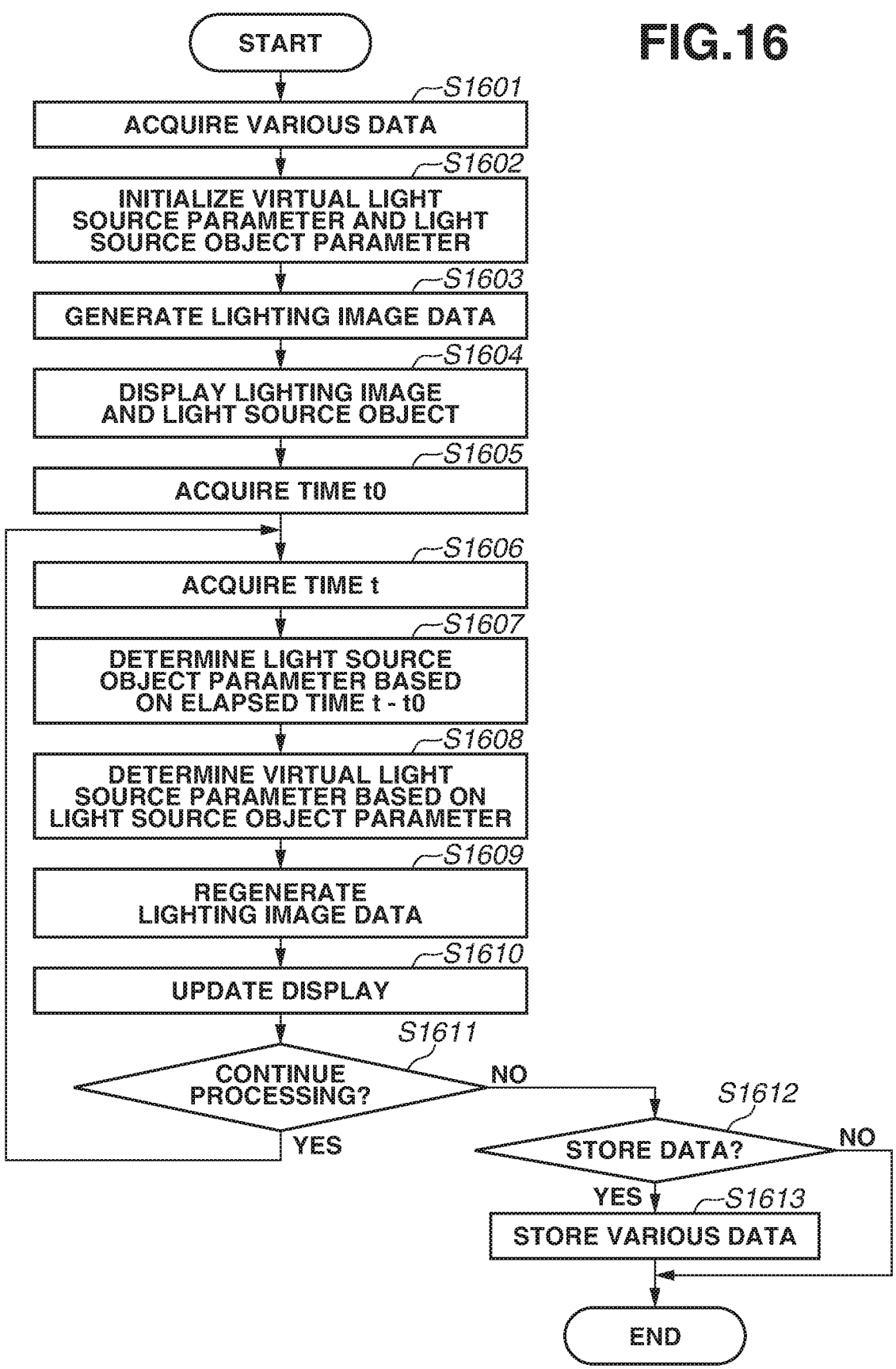
FIG. 16 is a flowchart illustrating a flow of processing to be executed by an information processing apparatus according to a fifth exemplary embodiment.

FIG. 16 is a flowchart illustrating a flow of processing to be executed by the information processing apparatus 1 according to the fifth exemplary embodiment.

In step S1601, the data acquisition unit 301 acquires input image data, an initial parameter for a virtual light source, and an initial parameter for a light source object, like in step S401 according to the first exemplary embodiment. In the present exemplary embodiment, the following parameters associated with a plurality of virtual light sources are collectively represented by the virtual light source parameter $Q_L = \{Q_0, Q_1, \ldots, Q_{K-1}\}$ (K represents the number of virtual light sources).

(Parameter $Q_k$ associated with a k-th virtual light source)

Figure 17:
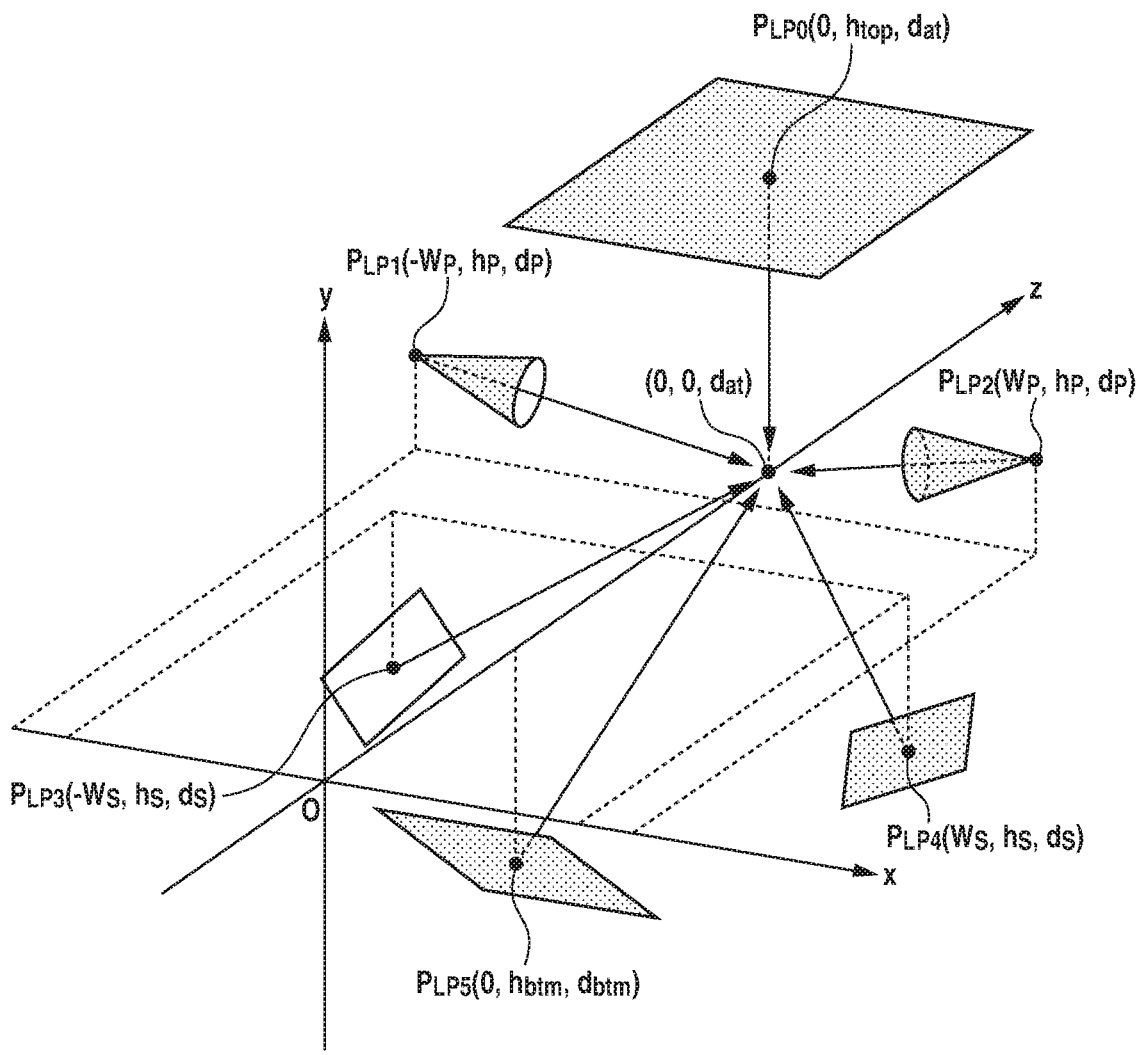
FIG. 17 illustrates an example of initial parameters associated with a virtual light source according to the fifth exemplary embodiment.

A position vector $P_{LPk}$ for the virtual light source=$(x_{LPk}, y_{LPk}, z_{LPk})$·the position vector $P_{LAk}$ through which the optical axis of the virtual light source passes=$(x_{LAk}, y_{LAk}, z_{LAk})$ A virtual light RGB intensity $(Ir_{Lk}, Ig_{Lk}, Ib_{Lk})$·Type$_{Lk}$ of the virtual light source Shape$_{Lk}$ of the virtual light source Size$_{Lk}$ of the virtual light source A degree of an irradiation angle $\theta_{Lk}$ of virtual light FIG. 17 illustrates an example of the initial parameter $Q_{L0} = \{Q_{00}, Q_{10}, \ldots, Q_{50}\}$ when K=6 holds. In FIG. 17, "Area" indicates that the type of the virtual light source is a surface light source, and "Point" indicates that the type of the virtual light source is a point light source. "Square" indicates that the shape of the surface light source is a square, and each numerical value in the item "Size$_{Lk}$" represents the length of one side of the square. In the example illustrated in FIG. 17, six virtual light sources are arranged so as to surround a point (0, 0, $d_{at}$) on the z-axis.

In the present exemplary embodiment, an identification (ID) indicating M light source object states, which are stored in advance, is used as the light source object parameter $q_L$, and the initial value $q_{L0}=0$ holds. FIG. 18 illustrates an example in which M=4 states of the light source object are set. In FIG. 18, light source objects 1800 to 1805 corresponding to K=6 virtual light sources, respectively, are included in each state, and am, k represents the degree of transmission of the k-th light source object in the m-th state.

The term "degree of transmission" used herein refers to a degree of see-through of the light source object. When the degree of transmission is "0", the light source object is depicted in an opaque state.

The processes of steps S1602 to S1605 and step S1606 are similar to the processes of steps S402 to S405 and step S408, respectively, and thus the descriptions thereof are omitted. When the lighting image is generated in step S1603, virtual reflection intensities may be calculated for each of K virtual light sources as described above in the first exemplary embodiment, and the calculated virtual reflection intensities may be added to each pixel value of the input image.

In step S1607, the change unit 306 determines the value of the light source object parameter $q_L$, i.e., the ID representing the state of the light source object, based on the elapsed time $\Delta t_0$ ($=t-t_0$) from the start time $t_0$ to the current time t. In the present exemplary embodiment, the light source object parameter $q_L$ corresponding to the elapsed time $\Delta t_0$ is determined according to the following equation.

$$q_L = \left\lfloor \mathrm{mod}\left(\frac{\Delta t_0}{T}, M\right) \right\rfloor \quad (13)$$

In Equation (13), T is a constant representing an interval. In this case, the value of the light source object parameter $q_L$ is repeatedly changed in a range from "0" to "M−1" every time the interval T elapses.

In step S1608, the lighting unit 302 determines the RGB intensity of the virtual light source included in the virtual light source parameter $Q_L$ based on the ID indicated by the light source object parameter $q_L$ determined in step S1607. The RGB intensity $(Ir_{Lk}, Ig_{Lk}, Ib_{Lk})$ (k=0, 1, ..., K−1) of the virtual light source is determined according to the following equation.

$$\begin{pmatrix} Ir_{Lk} \\ Ig_{Lk} \\ Ib_{Lk} \end{pmatrix} = (1 - \alpha_{q_L, k}) * \begin{pmatrix} Ir_{Lk0} \\ Ig_{Lk0} \\ Ib_{Lk0} \end{pmatrix} \quad (14)$$

In this case, the RGB intensity of the virtual light source indicates a value that increases as the degree of transmission of the light source object decreases.

The process of step S1609 is similar to the process of step S411, and thus the description thereof is omitted.

In step S1610, the image display unit 303 updates the display of the lighting image data, like in step S412. Specifically, the lighting image data regenerated in step S1609 is displayed by overwriting the image display area 601 on the GUI 6 displayed in step S1604 with the lighting image data. Further, the GUI display unit 307 renders the light source object 602 again in the image display area 601 based on the light source object parameter $q_L$ determined in step S1607.

The processes of steps S1611 to S1613 are similar to the processes of steps S413 to S415, respectively, and thus the descriptions thereof are omitted.

Figure 19:
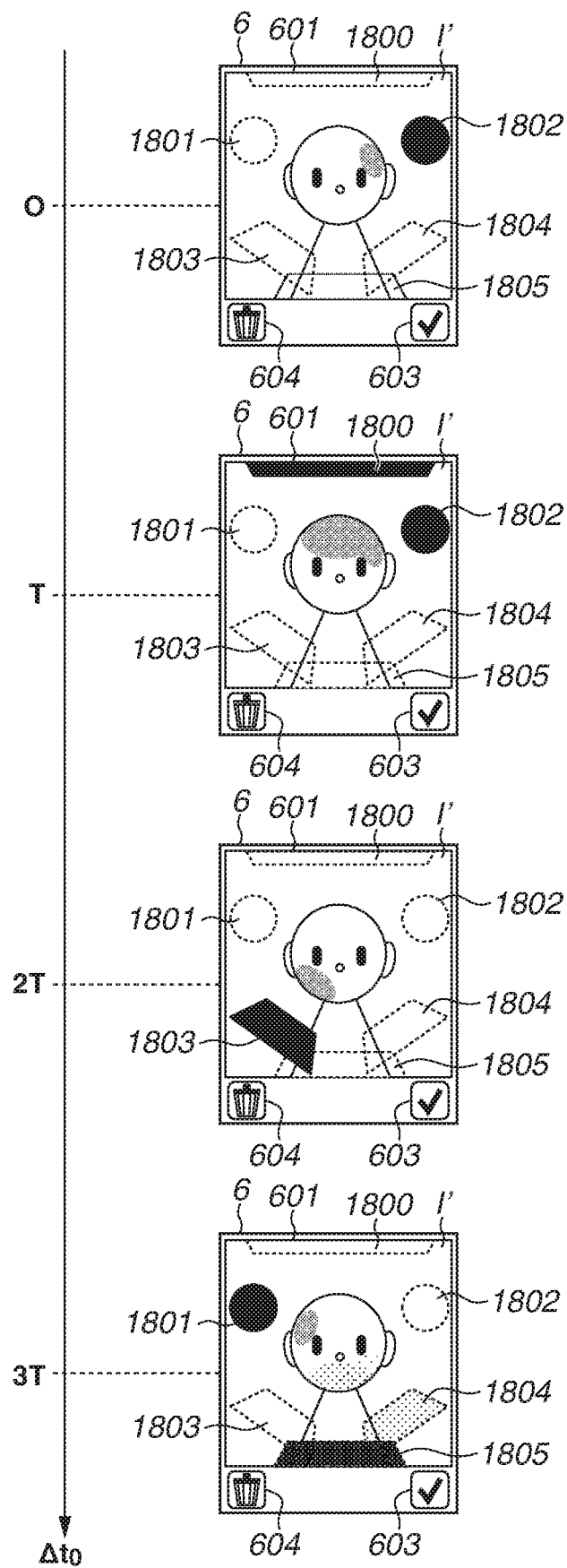
FIG. 19 illustrates an example of a change in a GUI and a lighting image according to the fifth exemplary embodiment.

FIG. 19 illustrates an example of a change in the GUI and the lighting image according to the present exemplary embodiment. FIG. 19 illustrates a state where M=4 states of the virtual light source are switched. In the example illustrated in FIG. 19, the degree of transmission of each of the K=6 light source objects 1800 to 1805 is changed based on the elapsed time $\Delta t_0$. The brightness of the portion irradiated with virtual light is also changed in accordance with the change in the degree of transmission of the light source object. If the user likes the displayed lighting image, the user can store the lighting image by pressing the determination button 603.

Advantageous Effects of Fifth Exemplary Embodiment

As described above, the information processing apparatus 1 according to the present exemplary embodiment displays the light source object and the lighting image while changing the state of the plurality of predetermined virtual light sources based on the elapsed time. This makes it possible to easily recognize the relationship between the light source object and the lighting effect to be added, and to more simply determine the lighting effect to be added.

Modified Examples

Figure 1B:
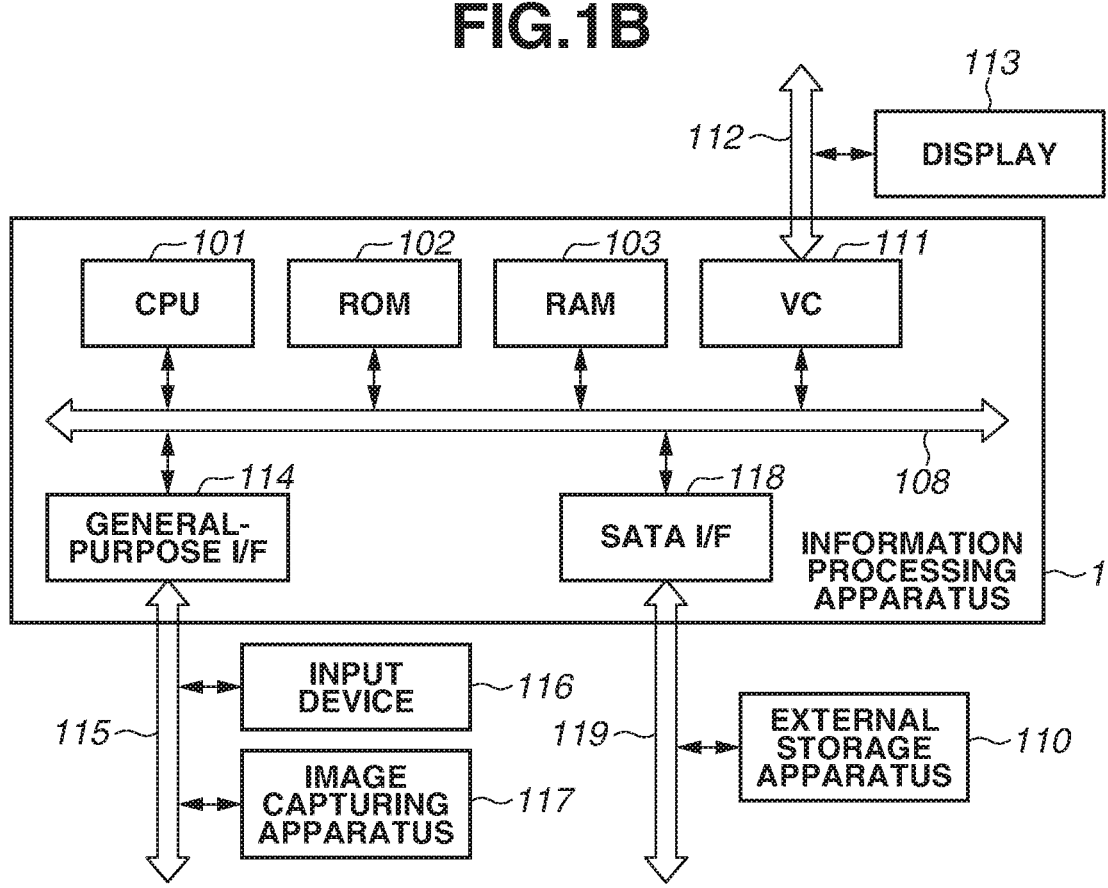

In the exemplary embodiments described above, the information processing apparatus 1 has a hardware configuration illustrated in FIG. 1A. However, the hardware configuration of the information processing apparatus 1 is not limited to the example described above. For example, the information processing apparatus 1 may have a hardware configuration illustrated in FIG. 1B. The information processing apparatus 1 includes the CPU 101, the ROM 102, the RAM 103, a video card (VC) 111, a general-purpose I/F 114, and a serial advanced technology attachment (SATA) I/F 118. The CPU 101 uses the RAM 103 as a work memory and executes the OS and various programs stored in the ROM 102, the external storage apparatus 110, or the like. Further, the CPU 101 controls each component via the system bus 108. The general-purpose I/F 114 is connected with an input device 116, such as a mouse or a keyboard, and an image capturing apparatus 117 via a serial bus 115. The SATA I/F 118 is connected with the external storage apparatus 110 via a serial bus 119. The VC 111 is connected with a display 113 via a serial bus 112. The CPU 101 displays a GUI provided by a program on the display 113, and receives input information indicating a user instruction obtained through the input device 116. The information processing apparatus 1 illustrated in FIG. 1B is implemented by, for example, a desktop PC. The information processing apparatus 1 is also implemented by a digital camera integrated with the image capturing apparatus 117, or a PC integrated with the display 113.

In the exemplary embodiments described above, the information processing apparatus 1 includes, as the image capturing unit 106, two cameras, i.e., the main camera 202 and the in-camera 201. However, the image capturing unit 106 is not limited to the example described above. For example, the information processing apparatus 1 may include only the main camera 202.

While an HDD is used as the external storage apparatus 110 in the exemplary embodiments described above, the external storage apparatus 110 is not limited to the example described above. For example, the external storage apparatus 110 may be a solid state drive (SSD). The external storage apparatus 110 is also implemented by media (recording media) and an external storage drive for accessing the media. As the media, a flexible disk (FD), a compact disc (CD)-ROM, a digital versatile disc (DVD), a universal serial bus (USB) memory, a magneto-optical (MO) disk, a flash memory, and the like can be used.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-207193, filed Nov. 2, 2018, which is hereby incorporated by reference herein in its entirety.

What is claimed is:

1. An information processing apparatus comprising:
   a display unit configured to display an image captured by an image capture device and an object representing a state of a virtual light source;
   a change unit configured to determine a first parameter of the object as a result of a change of the state of the virtual light source based on an elapsed time, the elapsed time being an elapse of time from a time when display of the object is started to a time when a user operation is not received by an operation unit of the information processing apparatus;
   a lighting unit configured to determine a second parameter of the virtual light source based on the first parameter; and
   an update unit configured to update the image using a lighting effect based on the second parameter.

2. The information processing apparatus according to claim 1, wherein the change is a change in at least one of a position, a direction, a brightness, a color, a degree of transmission, and a quantity number.

3. The information processing apparatus according to claim 1, further comprising a detection unit configured to detect a predetermined change of the information processing apparatus, wherein the elapsed time is an elapse of time from a time when the predetermined change is detected by the detection unit.

4. The information processing apparatus according to claim 3, wherein the predetermined change of the information processing apparatus is a change in one of a position and an orientation of the information processing apparatus.

5. The information processing apparatus according to claim 3, wherein the predetermined change of the information processing apparatus is a change in information about an input to the information processing apparatus.

6. The information processing apparatus according to claim 1, wherein the change of the state of the virtual light source is based on the user operation.

7. The information processing apparatus according to claim 6, wherein the elapsed time is an elapse of time from a time when the user operation is received.

8. The information processing apparatus according to claim 6, wherein, in a case where the user operation is received, the change unit completes the change of the state of the virtual light source.

9. The information processing apparatus according to claim 1, wherein, in a case where a user operation is not received for a predetermined period, the change unit changes the object and changes the state of the virtual light source based on the elapsed time.

10. An information processing method for controlling an information processing apparatus, the information processing method comprising:
displaying an image captured by an image capture device and an object representing a state of a virtual light source;
determining a first parameter of the object as a result of a change of the state of the virtual light source based on an elapsed time, the elapsed time being an elapse of time from a time when display of the object is started to a time when a user operation is not received by an operation unit of the information processing apparatus;
determining a second parameter of the virtual light source based on the first parameter; and
update the image using a lighting effect based on the second parameter.

11. The information processing method according to claim 10, wherein the change is a change in at least one of a position, a direction, a brightness, a color, a degree of transmission, and a quantity number.

12. The information processing method according to claim 10, further comprising detecting a predetermined change of the information processing apparatus,
wherein the elapsed time is an elapse of time from a time when the predetermined change is detected.

13. The information processing method according to claim 12, wherein the predetermined change of the information processing apparatus is a change in one of a position and an orientation of the information processing apparatus.

14. The information processing method according to claim 12, wherein the predetermined change of the information processing apparatus is a change in information about an input to the information processing apparatus.

15. The information processing method according to claim 10, wherein the change of the state of the virtual light source is based on the user operation.

16. The information processing method according to claim 15, wherein the elapsed time is an elapse of time from a time when the user operation is received.

17. The information processing method according to claim 15, wherein, in a case where the user operation is received, the change of the state of the virtual light source is completed.

18. A non-transitory storage medium storing a program causing a computer to execute a method for controlling an information processing apparatus, the method comprising:
displaying an image captured by an image capture device and an object representing a state of a virtual light source;
determining a first parameter of the object as a result of a change of the state of the virtual light source based on an elapsed time, the elapsed time being an elapse of time from a time when display of the object is started to a time when a user operation is not received by an operation unit of the information processing apparatus;
determining a second parameter of the virtual light source based on the first parameter; and
updating the image using a lighting effect based on the second parameter.

* * * * *

UNITED STATES PATENT AND TRADEMARK OFFICE
CERTIFICATE OF CORRECTION

PATENT NO. : 11,151,779 B2
APPLICATION NO. : 16/667146
DATED : October 19, 2021
INVENTOR(S) : Chiaki Kaneko Page 1 of 1

It is certified that error appears in the above-identified patent and that said Letters Patent is hereby corrected as shown below:

On the Title Page

After Item (65) Prior Publication Data
US 2020/0143588 A1    May 7, 2020

Please insert:
-- (30) Foreign Application Priority Data
Nov. 02, 2018 (JP) .................. 2018-207193 --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*